US012582903B2

(12) United States Patent
Takaara et al.

(10) Patent No.: US 12,582,903 B2
(45) Date of Patent: Mar. 24, 2026

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Hiroaki Takaara, Tokyo (JP); Ryohei Matsui, Tokyo (JP); Kazuhiro Oura, Tokyo (JP)

(73) Assignee: CYGAMES, INC., Tokyo (JP)

( * ) Notice: Subject to any disclaimer, the term of this patent is extended or adjusted under 35 U.S.C. 154(b) by 239 days.

(21) Appl. No.: 18/476,751

(22) Filed: Sep. 28, 2023

(65) Prior Publication Data

US 2024/0024771 A1    Jan. 25, 2024

Related U.S. Application Data

(63) Continuation of application No. PCT/JP2022/015987, filed on Mar. 30, 2022.

(30) Foreign Application Priority Data

Mar. 31, 2021    (JP) ................................ 2021-059646

(51) Int. Cl.
A63F 13/45        (2014.01)
A63F 13/822       (2014.01)
(52) U.S. Cl.
CPC ............ A63F 13/45 (2014.09); A63F 13/822 (2014.09); A63F 2300/538 (2013.01)
(58) Field of Classification Search
CPC ...... A63F 13/45; A63F 13/822; A63F 13/537; A63F 13/69; A63F 2300/538
See application file for complete search history.

(56) References Cited

U.S. PATENT DOCUMENTS

2003/0190951 A1* 10/2003 Matsumoto ............. A63F 13/63
                                                            463/30
2014/0243079 A1    8/2014 Tsukioka et al.
(Continued)

FOREIGN PATENT DOCUMENTS

JP          6075489 B1      2/2017
JP          2018-57981 A    4/2018
JP          2021007888 A    1/2021

OTHER PUBLICATIONS

"Slow Time (Diablo III)," Apr. 10, 2014, https://diablo.fandom.com/wiki/Slow_Time_(Diablo_III)?oldid=98159 (Year: 2014).*

(Continued)

*Primary Examiner* — Kevin Y Kim
(74) *Attorney, Agent, or Firm* — Osha Bergman Watanabe & Burton LLP

(57)                  ABSTRACT

A non-transitory computer readable medium stores a program causing a computer to execute: controlling a battle game on the basis of at least a play mode selected by a player from among a plurality of play modes including a normal mode and a short-cut mode having an execution time shorter than that of the normal mode; deriving progress and a result of the battle game by a computation process; performing animation rendering on a display on the basis of a result of the computation process during the battle game in at least the normal mode; determining a place of the player on the basis of the result of the battle game; and enabling the battle game in the short-cut mode in the case where the place of the player is a prescribed place and disabling the battle game in the short-cut mode in the case where the place of the player is not the prescribed place.

10 Claims, 22 Drawing Sheets

(56)        References Cited

U.S. PATENT DOCUMENTS

| 2014/0243089 A1 | 8/2014 | Tsukioka et al. |
| 2017/0128833 A1 | 5/2017 | Tsukioka et al. |

OTHER PUBLICATIONS

International Search Report issued in PCT/JP2022/015987 on Jun. 14, 2022 (5 pages).
Written Opinion of the International Searching Authority issued in PCT/JP2022/015987 on Jun. 14, 2022 (3 pages).
Office Action issued in corresponding Japanese Patent Application No. 2021-059646, mailed on Sep. 14, 2021 (9 pages).

* cited by examiner

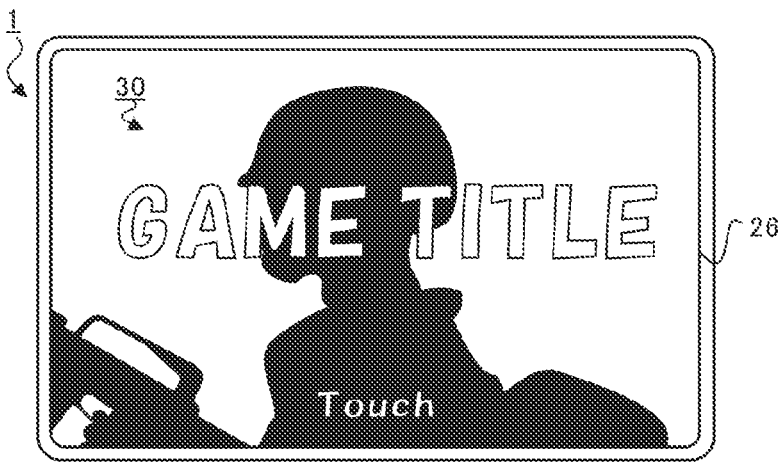
FIG.3A
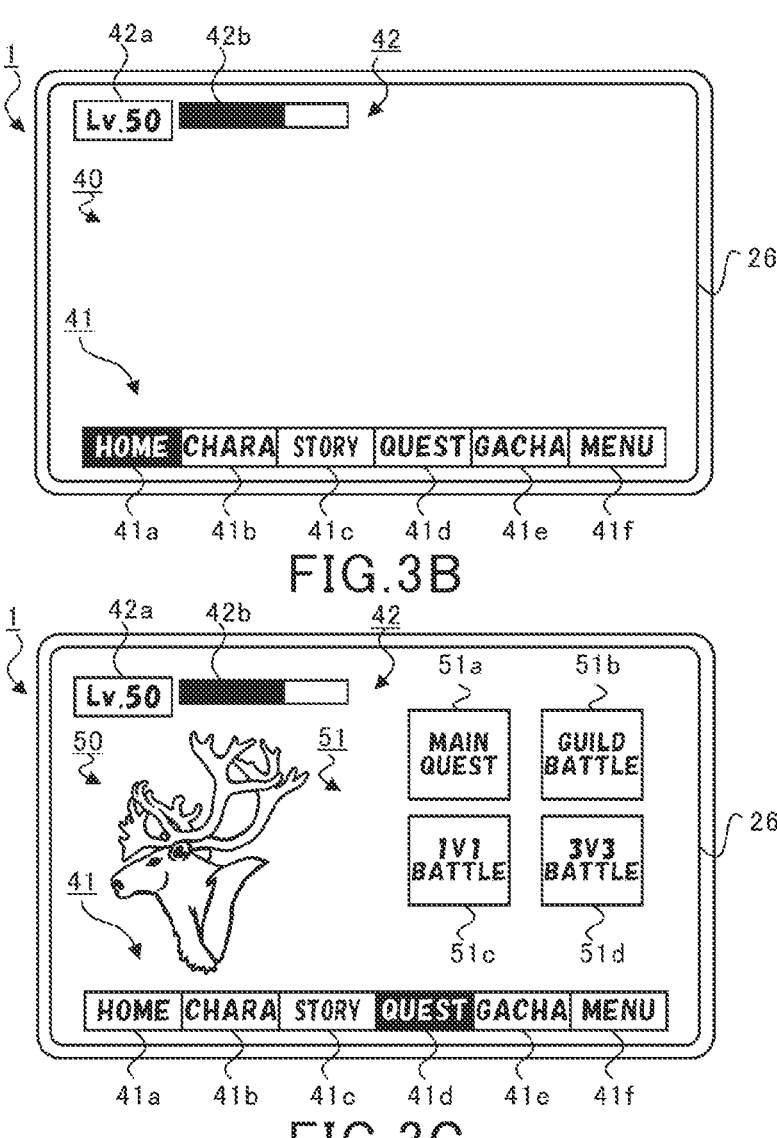
FIG.3B
FIG.3C

| PLAYER PLACE | CONTENT OF REWARD |
| --- | --- |
| 1 | IN-GAME CURRENCY "300" IS GRANTED |
| 2 | IN-GAME CURRENCY "250" IS GRANTED |
| 3 | IN-GAME CURRENCY "200" IS GRANTED |
| 4 | IN-GAME CURRENCY "175" IS GRANTED |
| 5 | IN-GAME CURRENCY "150" IS GRANTED |
| 6 | IN-GAME CURRENCY "145" IS GRANTED |
| 7 | IN-GAME CURRENCY "140" IS GRANTED |
| 8 | IN-GAME CURRENCY "135" IS GRANTED |
| 9 | IN-GAME CURRENCY "130" IS GRANTED |
| 10~19 | IN-GAME CURRENCY "125" IS GRANTED |
| 20~29 | IN-GAME CURRENCY "120" IS GRANTED |
| 30~39 | IN-GAME CURRENCY "115" IS GRANTED |
| 40~49 | IN-GAME CURRENCY "110" IS GRANTED |
| 50~59 | IN-GAME CURRENCY "100" IS GRANTED |
| 60~69 | IN-GAME CURRENCY "90" IS GRANTED |
| 70~79 | IN-GAME CURRENCY "80" IS GRANTED |
| ⋮ | ⋮ |
| 1000~4999 | IN-GAME CURRENCY "20" IS GRANTED |
| 5000~9999 | IN-GAME CURRENCY "15" IS GRANTED |
| 10000~11999 | IN-GAME CURRENCY "10" IS GRANTED |
| 12000~13999 | IN-GAME CURRENCY "5" IS GRANTED |
| 14000~14999 | IN-GAME CURRENCY "4" IS GRANTED |
| 15000~30000 | IN-GAME CURRENCY "3" IS GRANTED |

FIG.7

| | OPPONENT PLAYER IS WITHIN FIRST 50 PLACES | CURRENT PLAYER IS WITHIN FIRST 50 PLACES | SKIP-ALLOWING PLACE |
|---|---|---|---|
| (1) | ○ | ○ | × |
| (2) | ○ | × | × |
| (3) | × | ○ | × |
| (4) | × | × | ○ |

FIG.9

| | OPPONENT PLAYER IS LOWER THAN CURRENT PLAYER | SKIPPING IS ON | SKIP-ALLOWING PLACE | WORDING DISPLAYED |
|---|---|---|---|---|
| (1) | ○ | ○ | ○ | RANKING WILL NOT CHANGE. SKIPPING IS ON IN THIS BATTLE |
| (2) | ○ | ○ | × | RANKING WILL NOT CHANGE. THIS BATTLE IS NOT SKIPPABLE |
| (3) | ○ | × | ○ | RANKING WILL NOT CHANGE IN THIS BATTLE |
| (4) | ○ | × | × | RANKING WILL NOT CHANGE. THIS BATTLE IS NOT SKIPPABLE |
| (5) | × | ○ | ○ | SKIPPING IS SET TO ON |
| (6) | × | ○ | × | THIS BATTLE IS NOT SKIPPABLE BECAUSE OPPONENT PLAYER OR CURRENT PLAYER IS WITHIN FIRST 50 PLACES |
| (7) | × | × | ○ | [NO DISPLAY] |
| (8) | × | × | × | THIS BATTLE IS NOT SKIPPABLE BECAUSE OPPONENT PLAYER OR CURRENT PLAYER IS WITHIN FIRST 50 PLACES |

FIG.10

| | OPPONENT PLAYER IS IN 1501th PLACE OR LOWER | CURRENT PLAYER IS IN 1501th PLACE OR LOWER | SKIP-ALLOWING PLACE |
|---|---|---|---|
| (1) | O | O | × |
| (2) | O | × | × |
| (3) | × | O | × |
| (4) | × | × | O |

FIG.20A

| | OPPONENT PLAYER IS WITHIN FIRST 50 PLACES | OPPONENT PLAYER IS IN 1501th PLACE OR LOWER | CURRENT PLAYER IS WITHIN FIRST 50 PLACES | CURRENT PLAYER IS IN 1501th PLACE OR LOWER | SKIP-ALLOWING PLACE |
|---|---|---|---|---|---|
| (1) | O | × | O | × | × |
| (2) | O | × | × | × | × |
| (3) | O | × | × | O | × |
| (4) | × | × | O | × | × |
| (5) | × | × | × | × | O |
| (6) | × | × | × | O | × |
| (7) | × | O | O | × | × |
| (8) | × | O | × | × | × |
| (9) | × | O | × | O | × |

FIG.20B

| | OPPONENT PLAYER IS WITHIN FIRST 50 PLACES | OPPONENT PLAYER IS IN 1501th PLACE OR LOWER | CURRENT PLAYER IS WITHIN FIRST 50 PLACES | CURRENT PLAYER IS IN 1501th PLACE OR LOWER | SKIP-ALLOWING PLACE |
|---|---|---|---|---|---|
| (1) | ○ | × | ○ | × | ○ |
| (2) | ○ | × | × | × | × |
| (3) | ○ | × | × | ○ | ○ |
| (4) | × | × | ○ | × | × |
| (5) | × | × | × | × | × |
| (6) | × | × | × | ○ | × |
| (7) | × | ○ | ○ | × | ○ |
| (8) | × | ○ | × | × | × |
| (9) | × | ○ | × | ○ | ○ |

FIG.21

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2022/015987, filed on Mar. 30, 2022, which claims priority to Japanese Patent Application No. 2021-059646, filed on Mar. 31, 2021, the entire contents of which are incorporated by reference herein.

BACKGROUND ART

Technical Field

The present invention relates to an information processing program, an information processing method, and an information processing system.

Patent Literature 1 discloses a so-called skip function for deriving a result of a battle game by skipping the progression of the battle game.

CITATION LIST

Patent Literature

Patent Literature 1: JP 2018-57981 A

SUMMARY OF INVENTION

Technical Problem

However, if players are unconditionally allowed to use a skip function, there is risk of decreasing the interest in a battle game.

An object of the present invention is to provide an information processing program, an information processing method, and an information processing system capable of suppressing a decrease in interest in a battle game.

Solution to Problem

In order to solve the above-described problem, an information processing program causes a computer to execute: a process for controlling a battle game on the basis of at least a play mode selected by a player from among a plurality of play modes including a normal mode and a short-cut mode having a shorter execution time than the normal mode; a process for deriving progress and a result of the battle game by a computation process; a process for performing animation rendering on a display unit on the basis of a result of the computation process during the battle game in at least the normal mode; a process for determining a place of the player on the basis of the result of the battle game; and a process for enabling the battle game in the short-cut mode in the case where the place of the player is a prescribed place and disabling the battle game in the short-cut mode in the case where the place of the player is not the prescribed place.

In the process for performing animation rendering, the animation rendering on the display unit may be omitted partially or fully during the battle game in the short-cut mode.

The prescribed place may be a place included in a range of a preset first reference place or lower.

The prescribed place may be a place included in a range of a preset second reference place or higher.

In order to solve the above-described problem, an information processing method is executed by at least one computer, and the computer executes: a step for controlling a battle game on the basis of at least a play mode selected by a player from among a plurality of play modes including a normal mode and a short-cut mode having a shorter execution time than the normal mode; a step for deriving progress and a result of the battle game by a computation process; a step for performing animation rendering on a display unit on the basis of a result of the computation process during the battle game in at least the normal mode; a step for determining a place of the player on the basis of the result of the battle game; and a step for enabling the battle game in the short-cut mode in the case where the place of the player is a prescribed place and disabling the battle game in the short-cut mode in the case where the place of the player is not the prescribed place.

In order to solve the above-described problem, an information processing system causes at least one computer to execute: a process for controlling a battle game on the basis of at least a play mode selected by a player from among a plurality of play modes including a normal mode and a short-cut mode having a shorter execution time than the normal mode; a process for deriving progress and a result of the battle game by a computation process; a process for performing animation rendering on a display unit on the basis of a result of the computation process during the battle game in at least the normal mode; a process for determining a place of the player on the basis of the result of the battle game; and a process for enabling the battle game in the short-cut mode in the case where the place of the player is a prescribed place and disabling the battle game in the short-cut mode in the case where the place of the player is not the prescribed place.

Effects of Disclosure

The present invention can suppress a decrease in interest in a battle game.

BRIEF DESCRIPTION OF DRAWINGS

FIG. 3A is a diagram showing an example of a title screen.

FIG. 3B is a diagram showing an example of a home screen.

FIG. 3C is a diagram showing an example of a quest screen.

FIG. 7 is a diagram showing an example of a reward-content determination table on the basis of places in the 1V1 battle in this embodiment.

FIG. 9 is a diagram showing an example of a skip-allowed-place determination table in this embodiment.

FIG. 10 is a diagram showing an example of a display wording determination table in this embodiment.

FIG. 20A is a diagram showing an example of a skip-allowed-place determination table in a first modification.

FIG. 20B is a diagram showing an example of a skip-allowed-place determination table in a second modification.

FIG. 21 is a diagram showing an example of a skip-allowed-place determination table in a third modification.

DESCRIPTION OF EMBODIMENTS

An aspect of an embodiment according to the present invention will be described in detail below with reference to the accompanying drawings. The dimensions, materials, other specific numerical values, etc. given in this embodiment are merely examples for facilitating understanding and do not limit the present invention unless otherwise specifically mentioned. In this description and the drawings, the same reference signs are attached to elements having substantially the same functions and configurations, omitting repeated descriptions thereof, and elements that are not directly related to the present invention are not shown.

(Overall Configuration of Information Processing System S)

Figure 1:
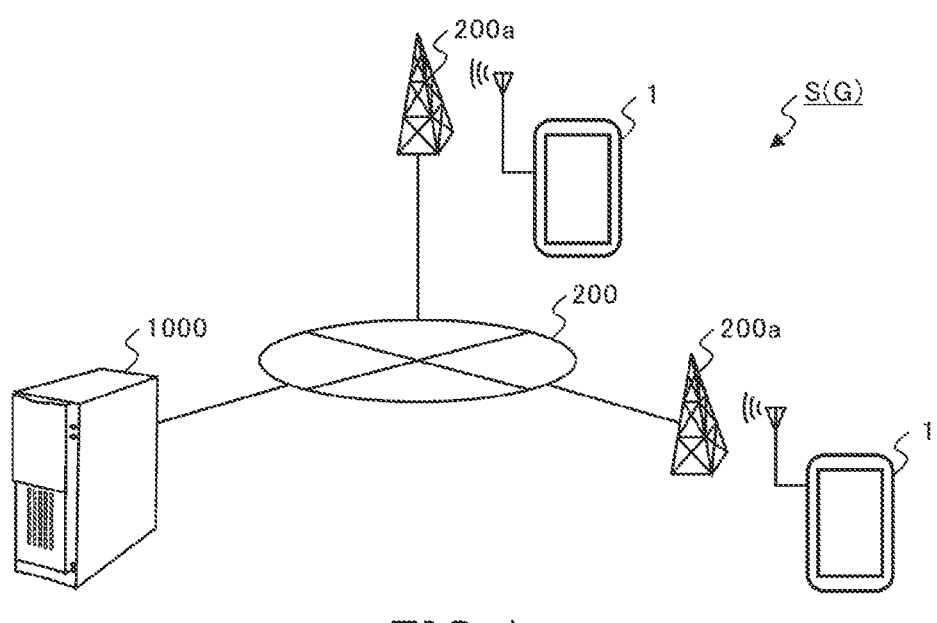
FIG. 1 is an illustration showing a schematic configuration of an information processing system.

FIG. 1 is an illustration showing a schematic configuration of an information processing system S. The information processing system S is a so-called client-server system that includes: player terminals 1; a server 1000; and a communication network 200 having communication base stations 200a.

Each of the player terminals (information processing devices) 1 can establish communication with the server 1000 via the communication network 200. The player terminals 1 widely include electronic appliances that can be communicatively connected to the server 1000 by wire or wirelessly. Examples of the player terminals 1 include smartphones, mobile phones, tablet devices, personal computers, game machines, etc. This embodiment will be described in the context of the case where smartphones are used as the player terminals 1.

The server 1000 is configured so as to be capable of communicating with the plurality of player terminals 1 and is communicatively connected to the plurality of player terminals 1. The server 1000 accumulates various types of information (referred to, hereinafter, as player information) for each item of player identification information (referred to, hereinafter, as a player ID) for identifying players playing the game.

The communication base stations 200a are connected to the communication network 200, and transmit information to and receive information from the player terminals 1 wirelessly. The communication network 200 is configured of a mobile phone network, the Internet, a local area network (LAN), a dedicated line, etc., and realizes wired or wireless communicative connection between the player terminals 1 and the server 1000.

In the information processing system S according to this embodiment, the player terminals 1 and the server 1000 function as a game device G. The player terminals 1 and the server 1000 individually have assigned thereto roles for controlling the proceeding of the game such that it is possible to proceed with the game through cooperation between the player terminals 1 and the server 1000.

(Hardware Configurations of Player Terminal 1 and Server 1000)

Figure 2A:
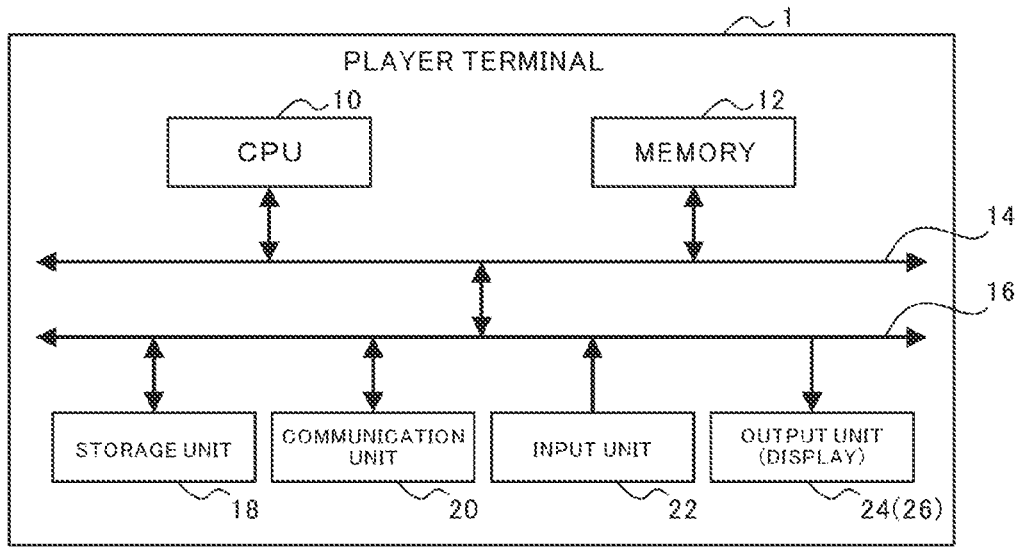
FIG. 2A is a drawing for illustrating the hardware configuration of a player terminal.
Figure 2B:
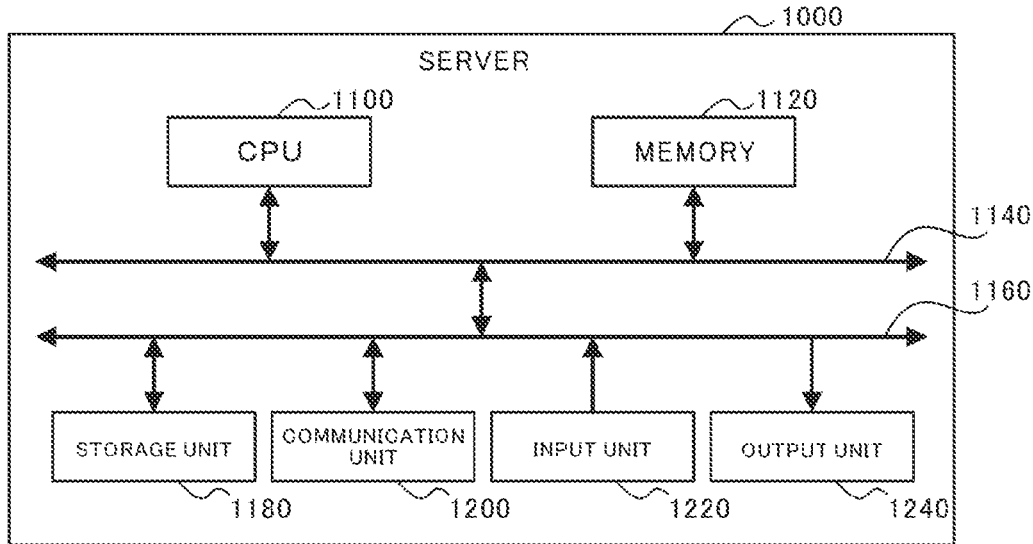
FIG. 2B is a drawing for illustrating the hardware configuration of a server.

FIG. 2A is a drawing for illustrating the hardware configuration of a player terminal 1. FIG. 2B is a drawing for illustrating the hardware configuration of the server 1000. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 1000 is configured to include a CPU 1100, a memory 1120, a bus 1140, an input/output interface 1160, a storage unit 1180, a communication unit 1200, an input unit 1220, and an output unit 1240.

The configurations and functions of the CPU 1100, the memory 1120, the bus 1140, the input/output interface 1160, the storage unit 1180, the communication unit 1200, the input unit 1220, and the output unit 1240 of the server 1000 are substantially the same as those of the CPU 10, the memory 12, the bus 14, the input/output interface 16, the storage unit 18, the communication unit 20, the input unit 22, and the output unit 24, respectively, of the player terminal 1. Thus, a description of the hardware configuration of the player terminal 1 will be given below, and a description of the server 1000 will be omitted.

The CPU 10 runs programs stored in the memory 12 to control the proceeding of the game. The memory 12 is configured of a read only memory (ROM) or a random access memory (RAM), and stores programs and various kinds of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a dynamic random access memory (DRAM), and stores various kinds of programs and data. At the player terminal 1, programs and data stored in the storage unit 18 are loaded into the memory 12 (RA) by the CPU 10.

The communication unit 20 is communicatively connected to the communication base stations 200a in a wireless manner, and transmits information to and receives information from the server 1000 via the communication network 200, such as various kinds of data and programs. At the player terminal 1, the programs, etc. received from the server 1000 are stored in the memory 12 or the storage unit 18.

The input unit 22 is configured of, for example, a touch-screen, buttons, a keyboard, a mouse, a cross key, or an analog controller with which player operations are input (operations are accepted). Alternatively, the input unit 22 may be a special controller provided in the player terminal 1 or connected (externally attached) to the player terminal 1. Alternatively, the input unit 22 may be configured of an acceleration sensor that detects tilting or movement of the player terminal 1 or a microphone that detects speech of the player. That is, the input unit 22 widely includes devices that enable the player to input his or her intents in distinguishable manners.

The output unit 24 is configured to include a display device and a speaker. The output unit 24 may be a device connected (externally attached) to the player terminal 1. In this embodiment, the player terminal 1 is provided with a display (display unit) 26 as the output unit 24 and is provided with a touchscreen as the input unit 22, wherein the touchscreen is overlaid on the display 26.

(Game Content)

Next, content of the game provided by the information processing system S (game device G) according to this embodiment will be described by way of an example. This embodiment provides a so-called battle game in which ally characters combat against enemy characters. The game administrator provides a player with a plurality of ally characters in the game according to this embodiment. For example, the player can possess a plurality of ally characters earned by lottery, which is a so-called gacha, or a plurality of ally characters distributed by the game administrator.

The player can select a plurality of (five here) ally characters from among the possessed ally characters, thereby organizing a party. The player can play a battle game by using the organized party. The purpose of a battle game is to earn a reward by beating the enemy characters (clearing the battle game) by means of the ally characters organized into a party. The player can play a plurality of types of battle games with different enemy characters and difficulty levels.

Figure 4:
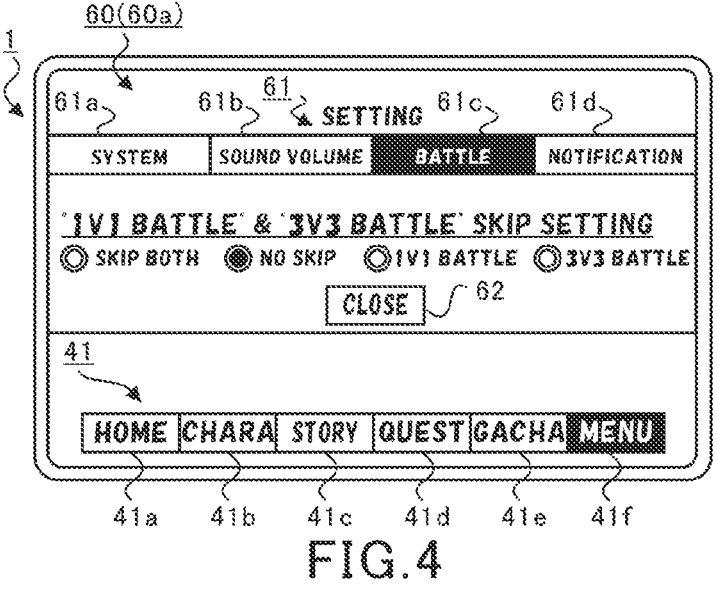
FIG. 4 is a diagram showing an example of a setting screen (battle setting screen).

FIG. 3A is a diagram showing an example of a title screen 30. FIG. 3B is a diagram showing an example of a home screen 40. FIG. 3C is a diagram showing an example of a quest screen. FIG. 4 is a diagram showing an example of a setting screen 60 (battle setting screen 60a). Game screens as shown in FIGS. 3A, 3B, and 3C are displayed on the display 26 of the player terminal 1. In this embodiment, the game screens are roughly classified into normal screens and a battle screen.

The normal screens mainly include a screen on which the player waits for a game to start and a screen on which the player performs various types of settings and confirms information. On the other hand, the battle screen is a screen displayed on the display 26 from the start to the end of a battle game. Here, all screens other than the battle screen are normal screens. The normal screens include a plurality of screens, such as the title screen 30 shown in FIG. 3A, the home screen 40 shown in FIG. 3B, a quest screen 50 shown in FIG. 3C, the setting screen 60 shown in FIG. 4, a gacha screen (not shown in the figure), and a menu screen (not shown in the figure).

The title screen 30 shown in FIG. 3A is a screen that is displayed first on the display 26 when the game is started on the player terminal 1. As shown in FIG. 3A, for example, the title name of the game that has been started is displayed on the title screen 30. Note that, besides the title name of the game, the name of the game administering company may be displayed on the title screen 30. Also, an image or a video suggesting the content of the game is displayed on the title screen 30 as a background of the title name of the game and the name of the game administrating company. For example, the background includes information about characters appearing in the main part of the game, information about the story of the main part of the game, etc.

In addition, game start operation information "Touch", which suggests an operating procedure necessary for starting the game, is displayed on the title screen 30. In this embodiment, the game is started by the player tapping the display 26 on the title screen 30.

The home screen 40 shown in FIG. 3B is a screen that is displayed first after the player has tapped the display 26 on the title screen 30 (i.e., after the game has been started). As shown in FIG. 3B, on the home screen 40, a menu bar 41 is displayed in the lower section of the display 26. The menu bar 41 is displayed in the lower section of the display 26 on normal screens other than the title screen 30.

A plurality of operation sections that can be operated (tapped) by the player are provided in the menu bar 41. A home-screen selection operation section 41a captioned "Home", an ally-character confirmation-screen selection operation section 41b captioned "Chara", a story-screen selection operation section 41c captioned "Story", a quest-screen selection operation section 41d captioned "Quest", a gacha-screen selection operation section 41e captioned "Gacha", and a menu-screen selection operation section 41f captioned "Menu" are provided in the menu bar 41. Note that in the menu bar 41, the operation section corresponding to each screen is highlighted so that the screen being displayed on the display 26 can be identified.

When the home-screen selection operation section 41a is tapped, the home screen 40 shown in FIG. 3B is displayed on the display 26. In addition, when the ally-character confirmation-screen selection operation section 41b is tapped, an ally character confirmation screen (not shown in the figure) is displayed on the display 26. In addition, when the story-screen selection operation section 41c is tapped, a story screen (not shown in the figure) is displayed on the display 26. In addition, when the quest-screen selection operation section 41d is tapped, the quest screen 50 shown in FIG. 3C is displayed on the display 26.

In addition, when the gacha-screen selection operation section 41*e* is tapped, the gacha screen (not shown in the figure) is displayed on the display 26. The gacha screen allows the player to perform a gacha lottery, in which an ally character can be earned by lottery.

Furthermore, when the menu-screen selection operation section 41*f* is tapped, the menu screen (not shown in the figure) is displayed on the display 26. In addition, various types of information can be confirmed on the menu screen. Furthermore, when a setting-screen selection operation section on the menu screen is tapped, the setting screen 60 shown in FIG. 4 is displayed on the display 26. On the setting screen 60, the player can perform various types of settings related to the game.

As shown in FIG. 4, setting type tabs 61 are displayed in the upper section of the setting screen 60. The setting type tabs 61 include a plurality of operation sections that can be operated (tapped) by the player. The setting type tabs 61 include: a system-setting selection operation section 61*a* captioned "System"; a sound-volume-setting selection operation section 61*b* captioned "Sound volume"; a battle-setting selection operation section 61*c* captioned "Battle"; and a notification-setting selection operation section 61*d* captioned "Notification". Note that, in the setting type tabs 61, the operation section corresponding to each screen is highlighted so that the screen being displayed on the display 26 can be identified.

The setting screen 60 shows any one of a system setting screen (not shown in the figure), a sound volume setting screen (not shown in the figure), the battle setting screen 60*a*, and a notification setting screen (not shown in the figure) by switching from one of the screens to another. More specifically, when the system-setting selection operation section 61*a* is tapped, the system setting screen (not shown in the figure) is displayed on the display 26. In addition, when the sound-volume-setting selection operation section 61*b* is tapped, the sound volume setting screen (not shown in the figure) is displayed on the display 26. In addition, when the battle-setting selection operation section 61*c* is tapped, the battle setting screen 60*a* shown in FIG. 4 is displayed on the display 26. Furthermore, when the notification-setting selection operation section 61*d* is tapped, the notification setting screen (not shown in the figure) is displayed on the display 26.

As shown in FIG. 4, a close operation section 62 is displayed on the battle setting screen 60*a*. On the battle setting screen 60*a*, various types of settings for battle games can be performed. As shown in FIG. 4, on the battle setting screen 60*a*, the player can perform setting related to a so-called skip function, which allows a result to be derived by skipping the progression of a battle game in "1V1 battle" and "3V3 battle" (described below). In this embodiment, a battle game ("1V1 battle" and "3V3 battle") is executed and controlled on the basis of at least a play mode selected by the player from a plurality of play modes. In this embodiment, the play modes in "1V1 battle" and "3V3 battle" include a normal mode (in the case where the skip function is not used) and a short-cut mode (in the case where the skip function is used) with a shorter execution time than the normal mode.

More specifically, in the case where "Skip both" is selected on the battle setting screen 60*a*, the game is set so that the skip function is used in "1V1 battle" and "3V3 battle". Furthermore, in the case where "No skip" is selected on the battle setting screen 60*a*, the game is set so that the skip function is not used in "1V1 battle" and "3V3 battle". In addition, in the case where "1V1 battle" is selected on the battle setting screen 60*a*, the game is set so that the skip function is used in "1V1 battle" and the skip function is not used in "3V3 battle". Furthermore, in the case where "3V3 battle" is selected on the battle setting screen 60*a*, the game is set so that the skip function is not used in "1V1 battle" and the skip function is used in "3V3 battle".

Although described below in detail, in this embodiment, the player can perform setting on the battle setting screen 60*a* so that the skip function is used. In the case where the player has performed setting on the battle setting screen 60*a* so that the skip function is used, when a battle game that is allowed to use the skip function is started, a result of the game is derived by means of the skip function for skipping the progression of the battle game. It should be noted that, in this embodiment, even in the case where the player has performed setting on the battle setting screen 60*a* so that the skip function is not used, the player can operate a skip operation section displayed during a battle game, thereby deriving a result of the game by means of the skip function for skipping the progression of the battle game according to the player operation.

In addition, the close operation section 62 is displayed on the battle setting screen 60*a*. When the close operation section 62 is tapped, the battle setting screen 60*a* disappears and is switched to the display of the menu screen (not shown in the figure) on the display 26.

In addition, as shown in FIG. 3B, a header display region 42 is provided in the upper section of the home screen 40. Player information associated with the player ID is displayed in the header display region 42. For example, level information 42*a* indicating the player level and a stamina indication bar 42*b* indicating the stamina of the player are displayed in the header display region 42. The player information includes the player ID, ally character identification information (referred to, hereinafter, as an ally character ID) for identifying ally characters possessed by the player, level information 42*a*, stamina information displayed in the stamina indication bar 42*b*, clearance information of battle games, etc.

Note that the stamina is a parameter required for the player to play a battle game. In this embodiment, a plurality of types of battle games are provided. Each battle game has set therein a stamina consumption value required to play the battle game, the maximum number of times per day the battle game can be executed, etc. In the case where the player is to play a battle game in which a stamina consumption value required to play the battle game is set, the player will play the battle game by consuming stamina. Therefore, the player cannot play the battle game when the stamina is insufficient.

When the ally-character confirmation-screen selection operation section 41*b* in the menu bar 41 is tapped, the ally character confirmation screen (not shown in the figure) is displayed on the display 26. All images of the ally characters corresponding to the ally character IDs associated with the player ID are displayed on the ally character confirmation screen.

That is, all ally characters possessed by the player are displayed on the ally character confirmation screen. Note that ally characters are assigned ally characters ID that differ from one another. Also, when the player earns a new ally character by, for example, a gacha lottery, etc., the ally character ID of the earned ally character is associated with the player ID of the player.

For each of the ally character IDs, information about an experience value and information about the level are stored in association therewith. The experience value increases when the player wins a battle game (described below) or uses a predetermined item. The level is set in accordance with the experience value. Also, the level increases each time the experience value reaches a predetermined value. Note that an upper limit of the level is set in each of the ally characters, and the level increases only within the range defined by the upper limit value.

In addition, base values of battle abilities, including life points, an attacking power, a defending power, etc. are set in each of the ally characters on the basis of the level. The higher the battle abilities of each of the ally characters is, the more advantageous the player becomes in proceeding with a battle game. In addition, the higher the level, the higher each of the base values set in each of the ally characters.

Furthermore, ally characters can be equipped with items of equipment such as weapons and protectors (ally characters can have items of equipment set thereon). Each of the items of equipment has set therein an additional value to the attacking power, the defending power, etc. When an ally character is equipped with equipment, the additional value of the equipment is added to the aforementioned base values, making it possible to enhance the battle abilities of the ally character. Information about these items of equipment such as weapons and protectors is also associated with the ally character ID and constitutes a portion of the player information.

When the story-screen selection operation section 41*c* on the menu bar 41 is tapped, the story screen (not shown in the figure) is displayed on the display 26. An image or a video for suggesting characters appearing in the main part of the game, the story of the main part of the game, etc. are displayed on the story screen. In addition, a plurality of main stories released according to the degree of proceeding of each type of game played by the player can be seen on the story screen.

In addition, when the quest-screen selection operation section 41*d* on the menu bar 41 is tapped, the quest screen 50 shown in FIG. 3C is displayed on the display 26. The menu bar 41, the header display region 42, and a plurality of game-type selection operation sections 51 captioned the respective type names of provided battle games are displayed on the quest screen 50. Here, four types of battle games are provided, and four game-type selection operation sections 51 are displayed, accordingly. Also, an image or a video suggesting characters appearing in the main part of the game, the story of the main part of the game, etc. are displayed on the quest screen 50 as a background of the four game-type selection operation sections 51.

The game-type selection operation sections 51 include: a main-quest selection operation section 51*a* captioned "Main quest"; a guild-battle selection operation section 51*b* captioned "Guild battle"; a 1V1-battle selection operation section 51*c* captioned "1V1 battle"; and a 3V3-battle selection operation section 51*d* captioned "3V3 battle". When the main-quest selection operation section 51*a* in FIG. 3C is tapped, a main quest screen 72 shown in FIG. 5A is displayed on the display 26.

Figure 5A:
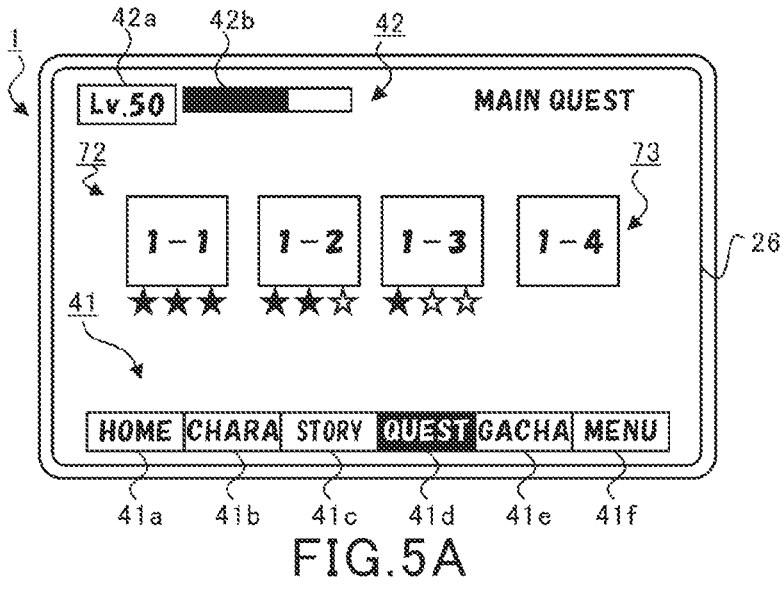
FIG. 5A is a drawing for illustrating an example of a main quest screen.
Figure 5B:
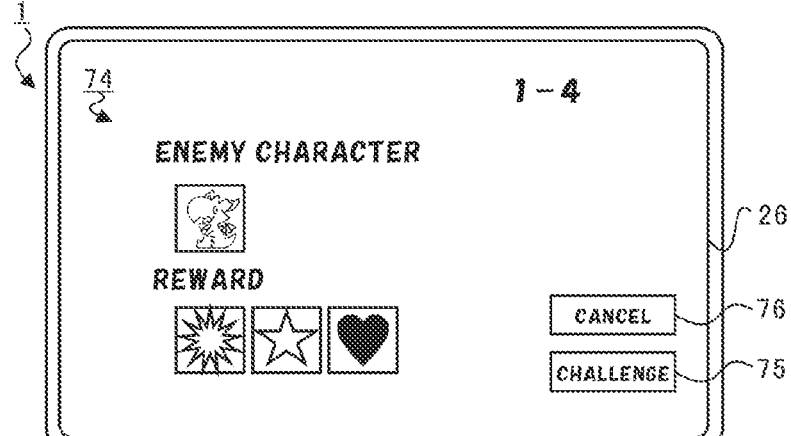
FIG. 5B is a drawing for illustrating an example of a main quest selection screen.
Figure 5C:
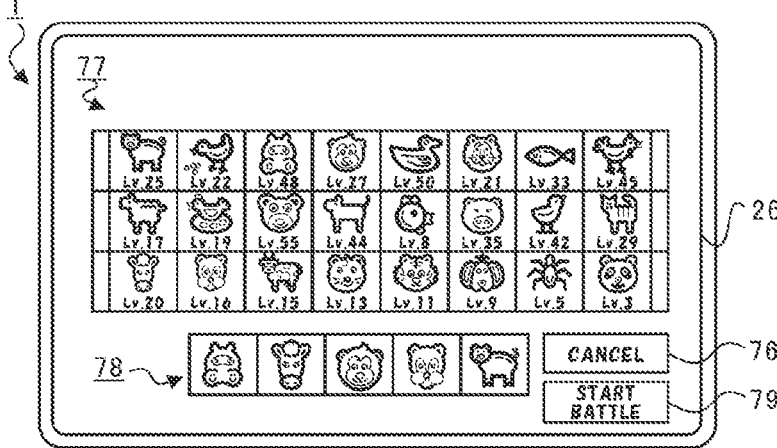
FIG. 5C is a drawing for illustrating an example of a party selection screen.

FIG. 5A is a drawing for illustrating an example of the main quest screen 72. FIG. 5B is a drawing for illustrating an example of a main quest selection screen 74. FIG. 5C is a drawing for illustrating an example of a party selection screen 77.

The menu bar 41, the header display region 42, and a quest operation section 73 for selecting a plurality of battle games (tiers) belonging to the main quest are displayed on the main quest screen 72.

In the quest operation section 73, clearance information of the battle games is displayed together. The clearance information is indicated with, for example, three stars. When a battle game belonging to the main quest is cleared, stars are earned according to the number of ally characters whose life points are 0 at the time the battle game is cleared. For example, three stars are earned in the case where there are no ally characters whose life points are 0, two stars are earned in the case where there is one ally character whose life points are 0, and one star is earned in the case where there are two or more ally characters whose life points are 0.

In the example of FIG. 5A, three stars are earned for the "1-1" battle game, two stars are earned for the "1-2" battle game, and one star is earned for the "1-3" battle game. In addition, no stars are earned for the "1-4" battle game, indicating that this battle game is not cleared.

Note that, in the main quest, the release condition that the previous battle game is cleared is set. For example, in the example of FIG. 5A, because the battle games up to the "1-3" battle game are cleared, the "1-4" battle game is released, but the subsequent battle games ("1-5" and after, not shown in the figure) are not released.

When the quest operation section 73 corresponding to, for example, the "1-4" battle game is operated (tapped) on the main quest screen 72, the main quest selection screen 74 shown in FIG. 5B is displayed on the display 26. On the main quest selection screen 74, an enemy character who will appear in the battle game and items (rewards) that can be earned in the battle game are displayed. In addition, on the main quest selection screen 74, a challenge operation section 75, captioned "Challenge", for challenging the battle game, as well as a cancel operation section 76, captioned "Cancel", for cancelling the processing corresponding to the currently displayed screen are displayed.

When the cancel operation section 76 is operated (tapped), the main quest screen 72 shown in FIG. 5A is displayed on the display 26, and challenge to the selected "1-4" battle game is cancelled.

On the other hand, when the challenge operation section 75 is operated (tapped), the party selection screen 77 shown in FIG. 5C is displayed on the display 26. On the party selection screen 77, all ally characters possessed by the player are displayed, and, below the ally characters, a selected-ally-character display region 78 for displaying the selected ally characters is displayed.

In addition, on the party selection screen 77, the cancel operation section 76 and a battle-start operation section 79, captioned "Start battle", are displayed.

On the party selection screen 77, when the player operates (taps) a displayed ally character, the operated ally character is displayed in the selected-ally-character display region 78. More specifically, here, ally character IDs to be used in the battle game (to determine a party) are selected from among the plurality of ally character IDs associated with the player ID. A party is organized as a result of the player selecting a plurality of ally characters. Note that the same ally character cannot be set in duplicate in a party organization.

When a party organization is completed and the battle-start operation section 79 is operated (tapped), the battle game is started, displaying a battle game screen 80 on the display 26.

Figure 6A:
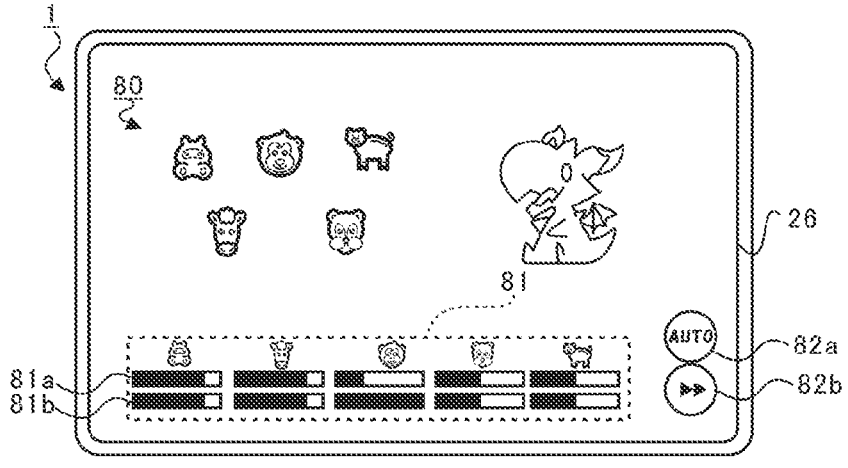
FIG. 6A is a drawing for illustrating an example of a battle game screen.
Figure 6B:
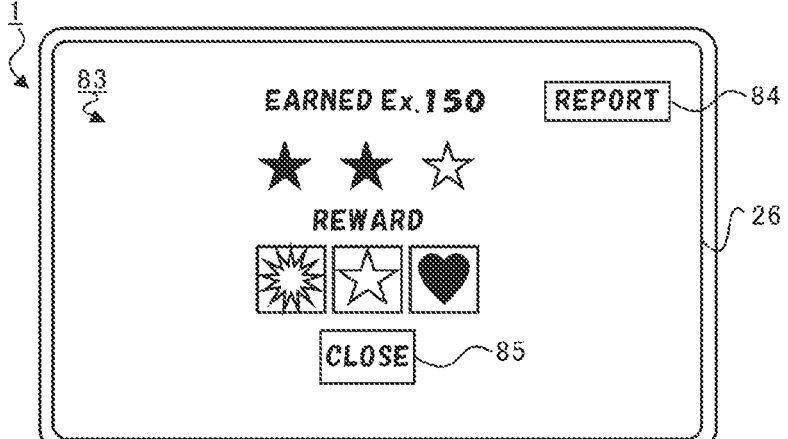
FIG. 6B is a drawing for illustrating an example of a result screen.
Figure 6C:
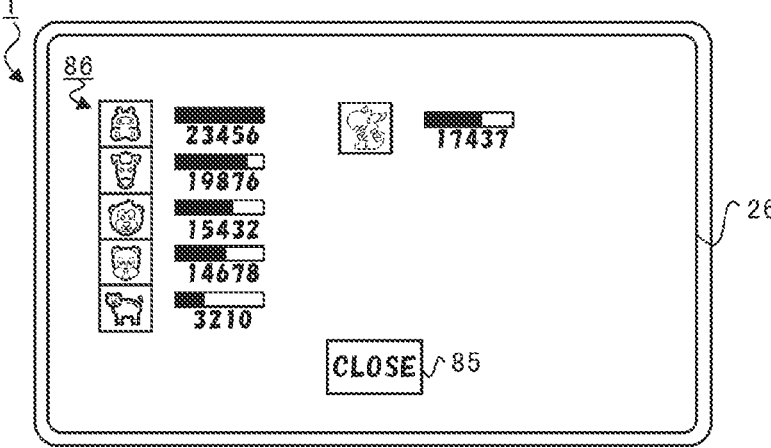
FIG. 6C is a drawing for illustrating an example of a report screen.

FIG. 6A is a drawing for illustrating an example of the battle game screen 80. FIG. 6B is a drawing for illustrating an example of a result screen 83. FIG. 6C is a drawing for illustrating an example of a report screen 86. The battle game screen 80 is displayed during the battle game, as shown in FIG. 6A. On the battle game screen 80, ally characters and enemy characters are displayed on the display 26. The ally characters are operated via computer control, inflicting damage on the enemy characters and suffering damage from the enemy characters. In addition, the enemy characters are operated via computer control, inflicting damage on the ally characters and suffering damage from the ally characters.

When an enemy character is given damage points, the damage points are subtracted from the life points of the enemy character. Similarly, when an ally character is given damage points, the damage points are subtracted from the life points of the ally character. When the life points of all enemy characters become 0, the player wins the battle game (clears the battle game), and when the life points of all ally characters become 0 (loses the battle game), the player loses the battle game.

Here, in the lower section of the battle game screen 80, an ally character display region 81 is provided, as shown in FIG. 6A. In the ally character display region 81, life points 81*a* and a killer technique gauge 81*b* for each of the ally characters are displayed. The killer technique gauge 81*b* increases when the ally character suffers damage from an enemy character or an enemy character is given damage. Also, when the killer technique gauge 81*b* reaches a prescribed maximum value, that ally character becomes able to use the killer technique. The killer technique gives more damage points to an enemy character than a normal attack, recovers the life points of an ally character, produces a special effect on an enemy character, and so on.

Here, there are two patterns of methods for using the killer technique. In one of the patterns, the player operates (taps) an ally character whose killer technique gauge 81*b*, displayed in the ally character display region 81, has reached the maximum value. In the other pattern, when the killer technique gauge 81*b* reaches the maximum value in an auto state, the ally character uses the killer technique via computer control. Note that an auto selection operation section 82*a* is displayed on the battle game screen 80, so that the player can switch between the auto state and a manual state by operating the auto selection operation section 82*a*. When the auto selection operation section 82*a* is operated in the manual state, the auto state in which the killer technique is used automatically is entered. In addition, when the auto selection operation section 82*a* is operated in the auto state, the manual state in which the killer technique is used manually is entered. Note that, even in the auto state, the player can also use the killer technique when the player operates (taps) an ally character in a state in which the killer technique gauge 81*b* reaches the maximum value and the killer technique is not used via computer control.

Furthermore, a quick-feed selection operation section 82*b* is displayed on the battle game screen 80, so that the player can quickly feed the execution of the battle in the battle game by operating the quick-feed selection operation section 82*b* in the auto state or the manual state. For example, there may be only one level of quick feed speed or multiple levels of quick feed speed. For example, the game can be preset so that the player can double the battle execution speed in the battle game by tapping the quick-feed selection operation section 82*b* once and quadruple the battle execution speed in the battle game by tapping the quick-feed selection operation section 82*b* twice. In addition, the level of quick feed speed to be set may be made to differ depending on the type of the battle game.

Then, when the battle game normally ends (normal end), the result screen 83 is displayed on the display 26, as shown in FIG. 6B. FIG. 6B shows a result screen 83, as an example, in the case where the ally characters have won.

On the result screen 83, a report display operation section 84 captioned "Report" and an end operation section 85 captioned "Close" are displayed, together with at least some items of game result information of the battle game.

Note that the game result information includes: the ally character IDs (party) of ally characters; the enemy character IDs of enemy characters; information about remaining situations of the ally characters and the enemy characters at the time the battle ended (whether or not the life points were 0 at the time the battle game ended); given damage points (total value); player operation information (manual state or auto state); battle log ID; information about the type of the battle game (main quest, guild battle, etc.); information associated with each type of battle game (clearance information, tier of the battle game, etc.); information about granted items; etc.

When the end operation section 85 is operated (tapped) on the result screen 83, the display on the display 26 switches from the battle screen to a normal screen. In short, the result screen 83 is a portion of the battle screen. Note that the normal screen to which the result screen 83 is switched may be the screen displayed just before being switched to the battle screen or may be a predetermined screen, such as the home screen 40. In this manner, the battle game ends as the display of the result screen 83 ends.

When the report display operation section 84 is operated (tapped) on the result screen 83, the report screen 86 shown in FIG. 6C is displayed on the display 26. The damage points (total value) given by the ally characters and the enemy characters, as well as the end operation section 85, are displayed on the report screen 86.

When the end operation section 85 is operated (tapped) here, the result screen 83 shown in FIG. 6B is displayed on the display 26.

Next, the 1V1 battle and the 3V3 battle will be described. Basic parts of these battle games are the same as those of the main quest, and descriptions thereof will be omitted. Instead, parts that differ from those of the main quest will be described.

The 1V1 battle is a battle game for combating with a party for 1V1 that has been associated in advance with another player ID. Also, the 3V3 battle is a battle game for combating with three parties for 3V3 that have been associated in advance with another player ID. That is, each player has preset three parties for 3V3. The 1V1 battle and the 3V3 battle have gameplay in which players compete for ranking (places) according to wins and losses in battles between the players. Also, the players are granted items (ranking rewards) according to their places in the 1V1 battle and the 3V3 battle determined at a prescribed time clock that has been preset. In other words, the contents of rewards are determined on the basis of final places of the players determined over a prescribed time period from the previous prescribed time clock to the next prescribed time clock.

In this embodiment, 15:00 is set as the prescribed time clock each day. Note that it suffices if a prescribed time clock is preset, and the prescribed time clock is not limited to a specific time clock. A plurality of time clocks each day, such as 12:00 and 18:00 each day, may be set as the prescribed time clock. Alternatively, the prescribed time clock may be set at prescribed intervals, such as 15:00 every Monday or 15:00 on the 20th of every month. The 1V1 battle and the 3V3 battle are the same except for the number of parties used for a battle game (i.e., one party is used for the 1V1 battle, and three parties are used for the 3V3 battle). Hence, in this embodiment, the 1V1 battle will be described below in detail.

FIG. 7 is a diagram showing an example of a reward-content determination table on the basis of places in the 1V1 battle in this embodiment. As shown in FIG. 7, in the reward-content determination table, the content of an item to be granted to the player is preset on the basis of his/her place in the 1V1 battle. As shown in FIG. 7, the higher the place in the 1V1 battle, the better the content of the item granted to the player on the basis of his/her place in the 1V1 battle, which will motivate the player to play a 1V1 battle with the goal of achieving a higher place.

On the other hand, because the contents of rewards are determined according to the respective rankings of the players at a prescribed time clock that has been preset, the frequency at which 1V1 battles are executed per unit time increases locally more than wanted just before the pre-scribed time clock, i.e., near the end of the prescribed time period, which may cause an increase in processing load. Times just before a prescribed time clock mean specifically the time period from 14:50 to 14:59, etc., if 15:00 is set as the prescribed time clock each day.

Therefore, in this embodiment, the use of the skip func-tion is restricted so as to be disabled in the case where at least one of the current player's place in the 1V1 battle and the opponent player's place in the 1V1 battle is within the first 50 places. In other words, a battle game in the short-cut mode is enabled in the case where the players are in a prescribed place, and a battle game in the short-cut mode is disabled in the case where the players are not in the prescribed place. Here, the prescribed place is a place included in a range of a preset first reference place (51st place) or lower. This makes it possible to suppress the risk of a local increase in the frequency per unit time at which more 1V1 battles than wanted are executed just before a prescribed timing, thereby reducing the risk of an increase in processing load. Also, for example, if more 1V1 battles than wanted are executed, there is risk of decreasing an interest in the battle game. Therefore, by constraining higher ranked players from using the skip function, it is possible to reduce the risk of a local increase in the frequency per unit of time at which more 1V1 battles than wanted are executed, thereby suppressing the risk of decreasing an interest in the battle game.

Figures 8A, 8B:
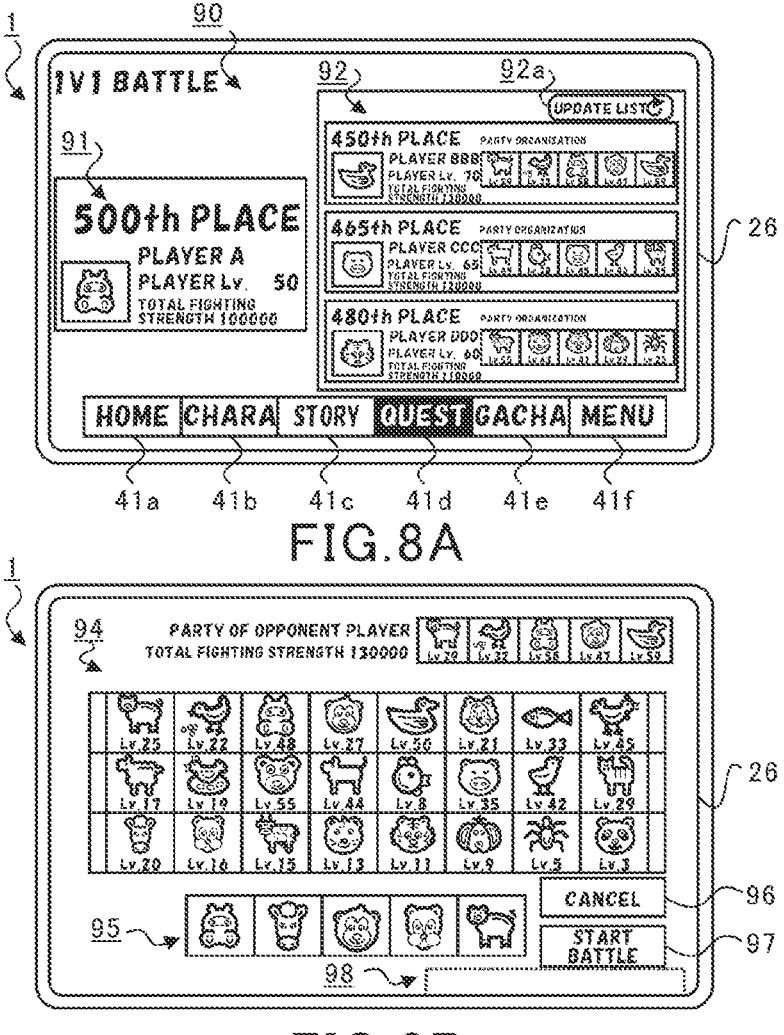
FIG. 8A is a drawing for illustrating an example of a 1V1 battle screen.
FIG. 8B is a drawing for illustrating an example of a party selection screen.

FIG. 8A is a drawing for illustrating an example of a 1V1 battle screen 90. FIG. 8B is a drawing for illustrating an example of a party selection screen 94. When the 1V1-battle selection operation section 51c on the quest screen 50 shown in FIG. 3C is operated, the 1V1 battle screen 90 in FIG. 8A is displayed on the display 26. The 1V1 battle is a battle game for combating with a party for the 1V1 battle that has been associated in advance with another player ID. That is, each player has preset a party for 1V1. A player information display region 91 and an opponent-player list display region 92 are displayed on the 1V1 battle screen 90.

Various types of information about the player are dis-played in the player information display region 91. More specifically, the player's place in the 1V1 battle, the player's player name, the player's player level, and the total fighting strength of ally characters possessed by the player are displayed.

A list of opponent players is displayed in the opponent-player list display region 92, showing multiple (three in this case) parties of other players. Basically, three other players whose places in the 1V1 battle are higher than the player's place are randomly displayed in the opponent-player list display region 92. For example, other players who are in a place higher than the place of the player by a prescribed number (e.g., 50) in the 1V1 battle are randomly displayed. It should be noted that, in irregular cases, such as in a case where the current player's place in the 1V1 battle is higher (e.g., 1st to 3rd), other players whose places are lower than the current player's place may be randomly displayed in order to secure opponent players.

In addition, various types of information are displayed for each of the other players in the opponent-player list display region 92. More specifically, the place of each of the other players in the 1V1 battle, the player name of each of the other players, the player level of each of the other players, the total fighting strength of ally characters possessed by each of the other players, and characters of the party for the 1V1 battle set by each of the other players are displayed.

In addition, a list update operation section 92a is dis-played in the opponent-player list display region 92. When the list update operation section 92a is operated, the list of opponent players displayed in the opponent-player list dis-play region 92 is updated.

Also, when the player selects the party of another player to combat against from the other players displayed in the opponent-player list display region 92, the party selection screen 94 shown in FIG. 8B is displayed on the display 26. On the party selection screen 94, all ally characters pos-sessed by the player are displayed, and, below the ally characters, a selected-ally-character display region 95 for displaying the selected ally characters is displayed. The player then determines his/her party and starts a battle game as in the main quest.

In addition, a cancel operation section 96 and a battle-start operation section 97 captioned "Start battle" are displayed on the party selection screen 94. When the player operates (taps) a displayed ally character on the party selection screen 94, the operated ally character is displayed in the selected-ally-character display region 95. That is, here, an ally character ID is selected for use in the battle game (for determining a party) from among the plurality of ally character IDs associated with the player ID. A party is organized as a result of the player selecting a plurality of ally characters. Note that the same ally character cannot be set in duplicate in a party organization.

FIG. 9 is a diagram showing an example of a skip-allowed-place determination table in this embodiment. In this embodiment, in the case where at least one of the current player's place in the 1V1 battle and the opponent player's place in the 1V1 battle is within the first 50 places, the game is set so that the current player is not in a place that allows skipping. In the case where neither the current player's place in the 1V1 battle nor the opponent player's place in the 1V1 battle is within the first 50 places, the game is set so that the current player is in a place that allows skipping.

More specifically, for example, in the case of (1) in the skip-allowed-place determination table in FIG. 9, the oppo-nent player's place is within the first 50 places, and the current player's place is within the first 50 places, and the game is thus set so that the current player is not in a place that allows skipping.

In addition, in the case of (2) in the skip-allowed-place determination table in FIG. 9, the current player's place is not within the first 50 places, but the opponent player's place is within the first 50 places, and the game is thus set so that the current player is not in a place that allows skipping.

Furthermore, in the case of (3) in the skip-allowed-place determination table in FIG. 9, the current player's place is within the first 50 places, but the opponent player's place is not within the first 50 places, and the game is thus set so that the current player is not in a place that allows skipping.

In addition, in the case of (4) in the skip-allowed-place determination table in FIG. 9, the opponent player's place is not within the first 50 places, and the current player's place is not within the first 50 places, and the game is thus set so that the current player is in a place that allows skipping.

When the battle-start operation section 97 is operated (tapped), the battle game is started. At this time, it is decided at the player terminal 1 whether or not the current player is in a place that allows skipping on the basis of the current player's place in the 1V1 battle and the opponent player's place in the 1V1 battle by referring to the skip-allowed-place determination table in FIG. 9. In the case where it is decided that the current player is in a place that allows skipping as a result, use of the skip function at the player terminal 1 is allowed. On the other hand, in the case where it is decided that the current player is not in a place that allows skipping, use of the skip function at the player terminal 1 is not allowed.

In addition, when a preset condition is satisfied, the player is presented with information about the 1V1 battle in an information display region 98 on the party selection screen 94. FIG. 10 is a diagram showing an example of a display wording determination table in this embodiment. In this embodiment, whether or not to display wording, as well as the display pattern of the wording, in the information display region 98 at the player terminal 1 is set on the basis of whether or not the opponent player's place in the 1V1 battle is lower than the current player's place, whether or not the game is set so that the skip function is used in "1V1 battle", and whether or not the current player is in a place that allows skipping.

More specifically, for example, in the case of (1) in the display wording determination table in FIG. 10, the game is set to display the wording "Ranking will not change. Skipping is ON in this battle" in the information display region 98 if the opponent player's place is lower than the current player's place, the game is set so that the skip function is used in "1V1 battle", and the current player is in a place that allows skipping. In a general 1V1 battle, other players whose places higher than the current player's place are displayed in the opponent-player list display region 92. On the other hand, in irregular cases, such as in a case where the current player's place in the 1V1 battle is higher (e.g., 1st to 5th), other players whose places are lower than the current player's place are displayed in the opponent-player list display region 92. In this embodiment, even if the current player beats another player whose place is lower than the current player's place in the 1V1 battle, the current player's place in the ranking does not change.

In addition, in the case of (2) in the display wording determination table in FIG. 10, the game is set to display the wording "Ranking will not change. This battle is not skippable" in the information display region 98 if the opponent player's place is lower than the current player's place, the game is set so that the skip function is used in "1V1 battle", and the current player is not in a place that allows skipping.

Furthermore, in the case of (3) in the display wording determination table in FIG. 10, the game is set to display the wording "Ranking will not change in this battle" in the information display region 98 if the opponent player's place is lower than the current player's place, the game is set so that the skip function is not used in "1V1 battle", and the current player is in a place that allows skipping.

Furthermore, in the case of (4) in the display wording determination table in FIG. 10, the game is set to display the wording "Ranking will not change. This battle is not skippable" in the information display region 98 if the opponent player's place is lower than the current player's place, the game is set so that the skip function is not used in "1V1 battle", and the current player is not in a place that allows skipping.

In addition, in the case of (5) in the display wording determination table in FIG. 10, the game is set to display the wording "Skipping is set to ON" in the information display region 98 if the opponent player's place is not lower than the current player's place, the game is set so that the skip function is used in "1V1 battle", and the current player is in a place that allows skipping.

Furthermore, in the case of (6) in the display wording determination table in FIG. 10, the game is set to display the wording "This battle is not skippable because opponent player or current player is within the first 50 places" in the information display region 98 if the opponent player's place is not lower than the current player's place, the game is set so that the skip function is used in "1V1 battle", and the current player is not in a place that allows skipping.

In addition, in the case of (7) in the display wording determination table in FIG. 10, the game is set so that no wording is displayed in the information display region 98 if the opponent player's place is not lower than the current player's place, the game is set so that the skip function is not used in "1V1 battle", and the current player is in a place that allows skipping.

More specifically, for example, the case where the game is set so that the skip function is not used in "1V1 battle", the player's place is the 500th place as shown in FIG. 8A, and the place of the player selected as an opponent player is 450th place corresponds to the aforementioned case of (7) in the display wording determination table in FIG. 10. In this case, no wording is displayed in the information display region 98, as shown in FIG. 8B.

Furthermore, in the case of (8) in the display wording determination table in FIG. 10, the game is set to display the wording "This battle is not skippable because opponent player or current player is within the first 50 places" in the information display region 98 if the opponent player's place is not lower than the current player's place, the game is set so that the skip function is not used in "1V1 battle", and the current player is not in a place that allows skipping.

In the manner as described above, it is possible to display appropriate information in the information display region 98 on the basis of whether or not the opponent player's place in the 1V1 battle is lower than the current player's place, whether or not the game is set so that the skip function is used in "1V1 battle", and whether or not the current player is in a place that allows skipping.

Figure 11A:
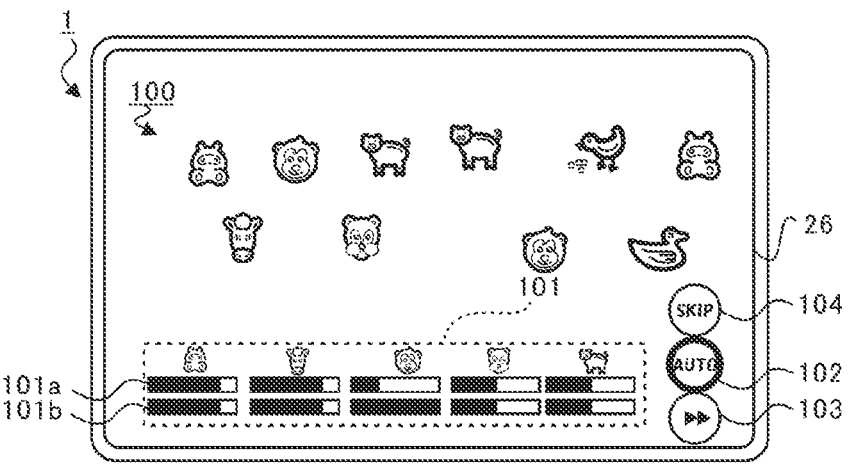
FIG. 11A is a drawing for illustrating an example of a battle game screen.
Figure 11B:
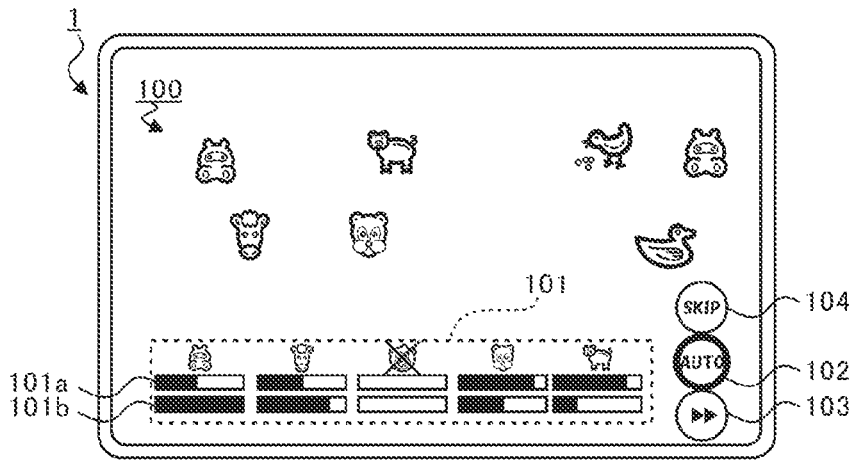
FIG. 11B is a drawing for illustrating an example of the battle game screen.
Figure 11C:
FIG. 11C is a drawing for illustrating an example of a skipping-in-progress screen.

FIGS. 11A and 11B are drawings for illustrating an example of the battle game screen. FIG. 11C is a drawing for illustrating an example of a skipping-in-progress screen. When a party organization is completed and the battle-start operation section 97 shown in FIG. 8B is operated (tapped), the battle game is started, displaying a battle game screen 100 on the display 26, as shown in FIG. 11A.

In the lower section of the battle game screen 100, an ally character display region 101 is provided as shown in FIG. 11A. Life points 101*a* and a killer technique gauge 101*b* for each ally character are displayed in the ally character display region 101.

In addition, ally characters and enemy characters whose life points are "0" during the battle game as a result of proceeding of the battle game disappear from the battle game screen 100 as shown in FIG. 11B. In addition, an ally character whose life points are "0" during the battle game is displayed in the ally character display region 101 with a mark indicating that the ally character is unable to combat, as shown in FIG. 11B. Thus, the player is informed of battle situations in the battle game in an easy-to-recognize way.

In addition, an auto selection operation section 102 is displayed on the battle game screen 100. Note that the game is preset so that the player cannot switch between the auto state and the manual state in a battle game in the 1V1 battle, as described above, causing the battle game to proceed in the auto state at all times. Therefore, the killer technique cannot be used manually in a battle game in the 1V1 battle. For this reason, the auto selection operation section 102 is highlighted at all times, as shown in FIG. 11A.

In addition, a quick-feed selection operation section 103 is displayed on the battle game screen 100. The player can quickly feed the execution of the battle in the battle game by operating the quick-feed selection operation section 103. Here, the game is preset so that the player can double the battle execution speed in the battle game by tapping the quick-feed selection operation section 103 once and quadruple the battle execution speed in the battle game by tapping the quick-feed selection operation section 103 twice.

In addition, when the use of the skip function is allowed in the case where the game is set so that the skip function is not used in "1V1 battle", a skip selection operation section 104 is displayed on the battle game screen 100, as shown in FIG. 11A. In other words, the skip selection operation section 104 is displayed on the battle game screen 100 only when use of the skip function is allowed.

When the player operates the skip selection operation section 104, a skipping-in-progress screen 110 shown in FIG. 11C is displayed on the display 26 for a certain time period. In this embodiment, the certain time period for which the skipping-in-progress screen 110 is displayed on the display 26 when the skip function is used is shorter than the time required when the battle game is made to proceed without using the skip function and the time required when battle execution is quickly fed in the battle game as a result of the quick-feed selection operation section 103 being operated. That is, the time for which the battle game is executed is shorter in the short-cut mode (mode in which the skip function is used) than in the normal mode (mode in which the skip function is not used).

On the skipping-in-progress screen 110, not only is the entire screen of the display 26 dimmed but also the wording "Skipping" is displayed at the center of the display 26, thus informing the player that the skip function has been used. In other words, animation rendering is partially or fully omitted in the case where the skipping-in-progress screen 110 is displayed on the display 26 as a result of the skip function being used, compared with the case where the battle game screen 100 is displayed on the display 26 as a result of the skip function not being used. It is possible to mitigate the processing load at the player terminal 1 by partially or fully omitting animation rendering as described above. Note that audio output that is executed at the same time as animation rendering may also be omitted partially or fully. By doing so, it is possible to mitigate the processing load at the player terminal 1.

Figure 12A:
FIG. 12A is a drawing for illustrating an example of a result screen.
Figure 12B:
FIG. 12B is a drawing for illustrating an example of the result screen.
Figure 12C:
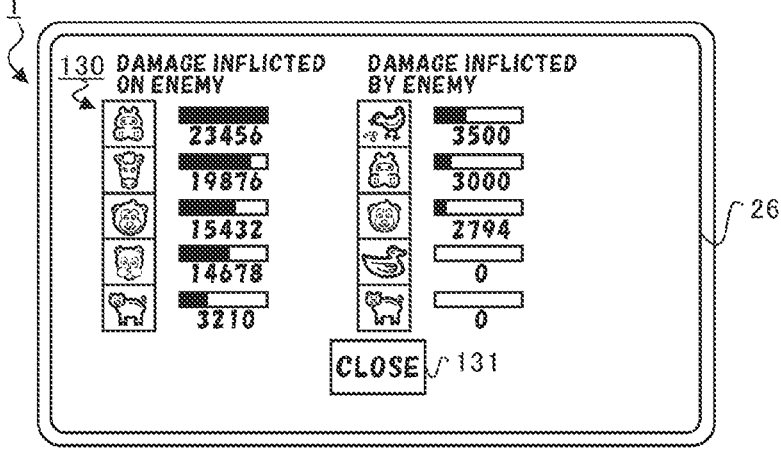
FIG. 12C is a drawing for illustrating an example of a report screen.

FIGS. 12A and 12B are drawings for illustrating an example of a result screen 120. FIG. 12C is a drawing for illustrating an example of a report screen 130. After the skipping-in-progress screen 110 shown in FIG. 11C is displayed on the display 26 for a certain time period, the result screen 120 is displayed on the display 26.

In the case where the player wins the battle game, "VICTORY" is displayed at the center of the result screen 120 as shown in FIG. 12A, informing the player that the player has won the battle game.

On the other hand, in the case where the player loses the battle game, "LOSE . . . " is displayed at the center of the result screen 120 as shown in FIG. 12B, informing the player that the player has lost the battle game. That is, at least a portion of the game result information of the battle game is displayed on the result screen 120.

In addition, a report display operation section 121 captioned "Report" and a next operation section 122 captioned "Next" are displayed on the result screen 120, as shown in FIGS. 12A and 12B.

When the report display operation section 121 is operated (tapped) on the result screen 120, the report screen 130 shown in FIG. 12C is displayed on the display 26. The content displayed on the report screen 130 is the same as that on the aforementioned report screen 86 shown in FIG. 6C, and a description thereof will be omitted.

In addition, a close operation section 131 is displayed on the report screen 130. When the close operation section 131 is operated (tapped), the result screen 120 shown in FIG. 12A or FIG. 12B is displayed on the display 26 again.

In addition, when the next operation section 122 is operated (tapped) on the result screen 120, the screen on the display 26 is switched to the 1V1 battle screen 90 shown in FIG. 8A.

Figure 13:
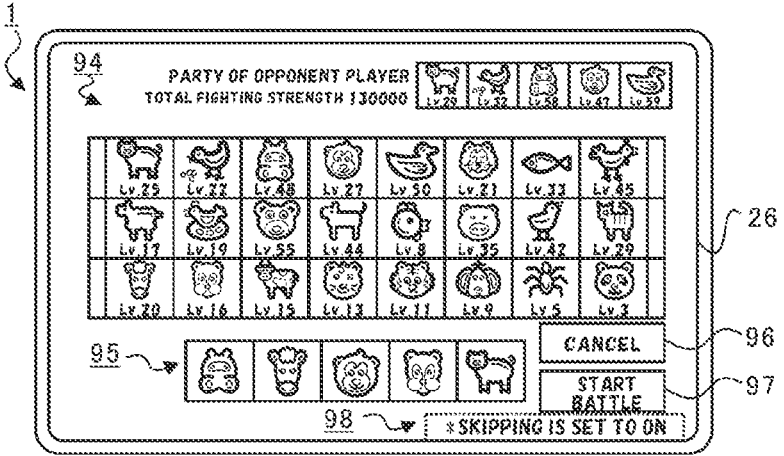
FIG. 13 is a drawing for illustrating an example of a party selection screen.

FIG. 13 is a drawing for illustrating an example of the party selection screen. For example, a case where the game is set so that the skip function is used in "1V1 battle", the player's place is the 500th place as shown in FIG. 8A, and the place of the player selected as an opponent player is the 450th place corresponds to the case of (5) in the aforementioned display wording determination table in FIG. 10. In this case, the wording "Skipping is set to ON" is displayed in the information display region 98 as shown in FIG. 13.

When the battle-start operation section 97 is operated (tapped) in the case corresponding to (1) or (5) in the aforementioned display wording determination table in FIG. 10, the skipping-in-progress screen 110 is displayed on the display 26 for a certain time period, instead of displaying the battle game screen 100 on the display 26. Also, after the skipping-in-progress screen 110 has been displayed on the display 26 for a certain time period, the result screen 120 is displayed on the display 26. In this manner, in the case where the game is preset by the player so that the skip function is used in "1V1 battle" and the player is in a place that allows skipping, display of the battle game screen 100 on the display 26 is omitted. This suppresses the player feeling bothered, making it possible to suppress the risk of decreasing an interest in the battle game.

Figures 14A, 14B:
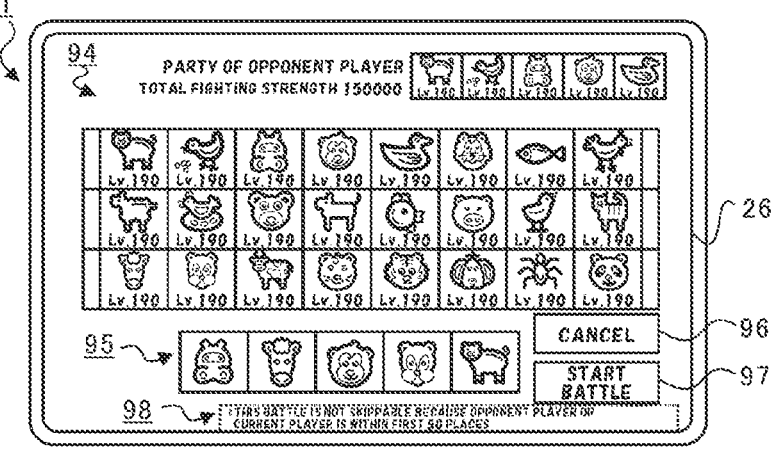
FIG. 14A is a drawing for illustrating an example of a party selection screen.
FIG. 14B is a drawing for illustrating an example of a battle game screen.

FIG. 14A is a drawing for illustrating an example of the party selection screen 94. For example, a case where the game is set so that the skip function is used in "1V1 battle", the player's place is the 50th place, and the place of the player selected as an opponent player is the 45th place corresponds to the case of (6) in the aforementioned display wording determination table in FIG. 10. In this case, the wording "This battle is not skippable because opponent player or current player is within the first 50 places" is displayed in the information display region 98 as shown in FIG. 14.

When the battle-start operation section 97 is operated (tapped) in the cases of (2), (4), (6), and (8) in the aforementioned display wording determination table in FIG. 10, the battle game screen 100 is displayed on the display 26. In this case, the skip selection operation section 104 is not displayed on the battle game screen 100, as shown in FIG. 14B. In this manner, in the case where use of the skip function is not allowed, the player can be informed so in advance and thus know that the skip function cannot be used before execution of the battle game. Furthermore, in the case where use of the skip function is not allowed, display of the skip selection operation section 104 on the battle game screen 100 is disabled, which can avoid a situation in which the skip selection operation section 104 is displayed despite that the skip function cannot be used. Consequently, it is possible to suppress the risk of the player feeling uncomfortable in the ongoing battle game.

Next, basic configurations and communication processing of the player terminal 1 and the server 1000 for executing the game according to this embodiment will be described. Note that an example of basic communication processing for proceeding with the game, as well as main communication processing pertaining to image display processing, will be described here, and the description of other processing will be omitted.

(Functional Configuration of Player Terminal 1)

Figure 15:
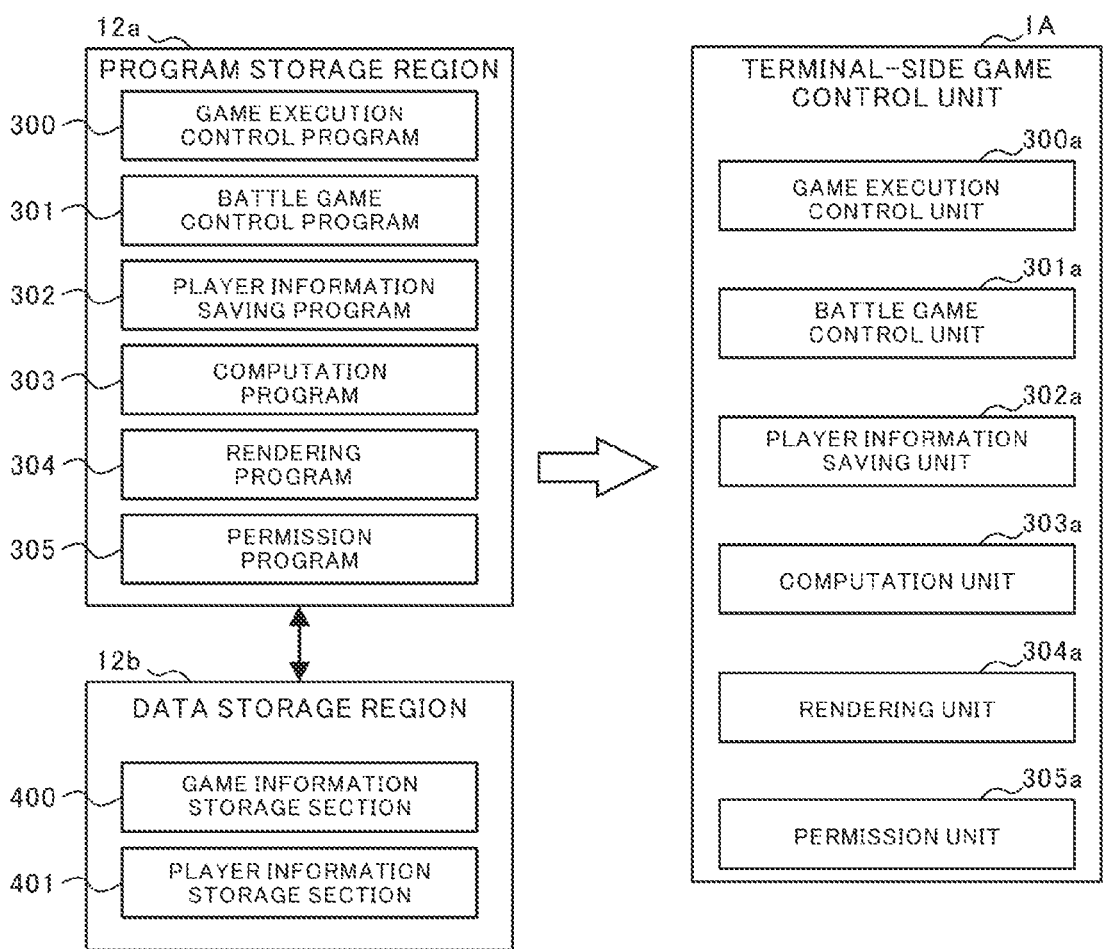
FIG. 15 is a diagram for illustrating the configuration of a memory in the player terminal and functions of the player terminal as a computer.

FIG. 15 is a diagram for illustrating the configuration of the memory 12 in the player terminal 1 and functions of the player terminal 1 as a computer. A program storage region 12a and a data storage region 12b are provided in the memory 12. When the game is started, the CPU 10 stores terminal-side game control programs (modules) in the program storage region 12a.

The terminal-side game control programs include: a game execution control program 300; a battle game control program 301; a player-information saving program 302; a computation program 303; a rendering program 304; and a permission program 305. The programs listed in FIG. 15 are examples, and many other programs are provided as the terminal-side game control programs.

In the data storage region 12b, a game information storage section (storage section) 400 and a player information storage section 401 are provided as storage sections for storing data. Each of the aforementioned storage sections is an example, and many other storage sections are provided in the data storage region 12b.

The CPU 10 operates the programs stored in the program storage region 12a and updates data in each of the storage sections in the data storage region 12b. Also, the CPU 10 causes the player terminal 1 (computer) to function as a terminal-side game control unit 1A by operating the programs stored in the program storage region 12a. The terminal-side game control unit 1A includes: a game execution control unit 300a; a battle game control unit 301a; a player-information saving unit 302a; a computation unit 303a; and a rendering unit 304a; and a permission unit 305a.

More specifically, the CPU 10 causes the computer to function as the game execution control unit 300a by operating the game execution control program 300. Similarly, the CPU 10 causes the computer to function as the battle game control unit 301a, the player-information saving unit 302a, the computation unit 303a, the rendering unit 304a, and the permission unit 305a by operating the battle game control program 301, the player-information saving program 302, the computation program 303, the rendering program 304, and the permission program 305, respectively.

The game execution control unit 300a controls the proceeding of the entire game. For example, the game execution control unit 300a transmits login information to the server 1000 when the player logs in the game. In addition, the game execution control unit 300a transmits opponent-player candidate request information to the server 1000 on the basis of a player operation.

The battle game control unit 301a is responsible for controlling the execution of a battle game. For example, in response to an operation input to the player terminal 1, the battle game control unit 301a controls the battle game on the basis of at least the play mode selected by the player from among a plurality of play modes including the normal mode and the short-cut mode with a shorter execution time than the normal mode.

The player-information saving unit 302a saves player information received from the server 1000 in the player information storage section 401.

The computation unit 303a derives progress and a result of the battle game through a computation process. More specifically, the computation unit 303a executes processing related to determination and execution of an attack carried out by each character in the battle game, processing for deciding whether or not each character has been damaged and how severely each character has been damaged, processing for selecting a motion related to position movement and dropout of each character, and processing for determining a win and a loss in the battle game.

The rendering unit 304a executes animation rendering on the display 26 on the basis of the result of the computation process during the battle game in at least the normal mode.

The permission unit 305a enables a battle game in the short-cut mode in the case where players are in a prescribed place and disables a battle game in the short-cut mode in the case where players are not in the prescribed place.

(Functional configuration of server 1000)

Figure 16:
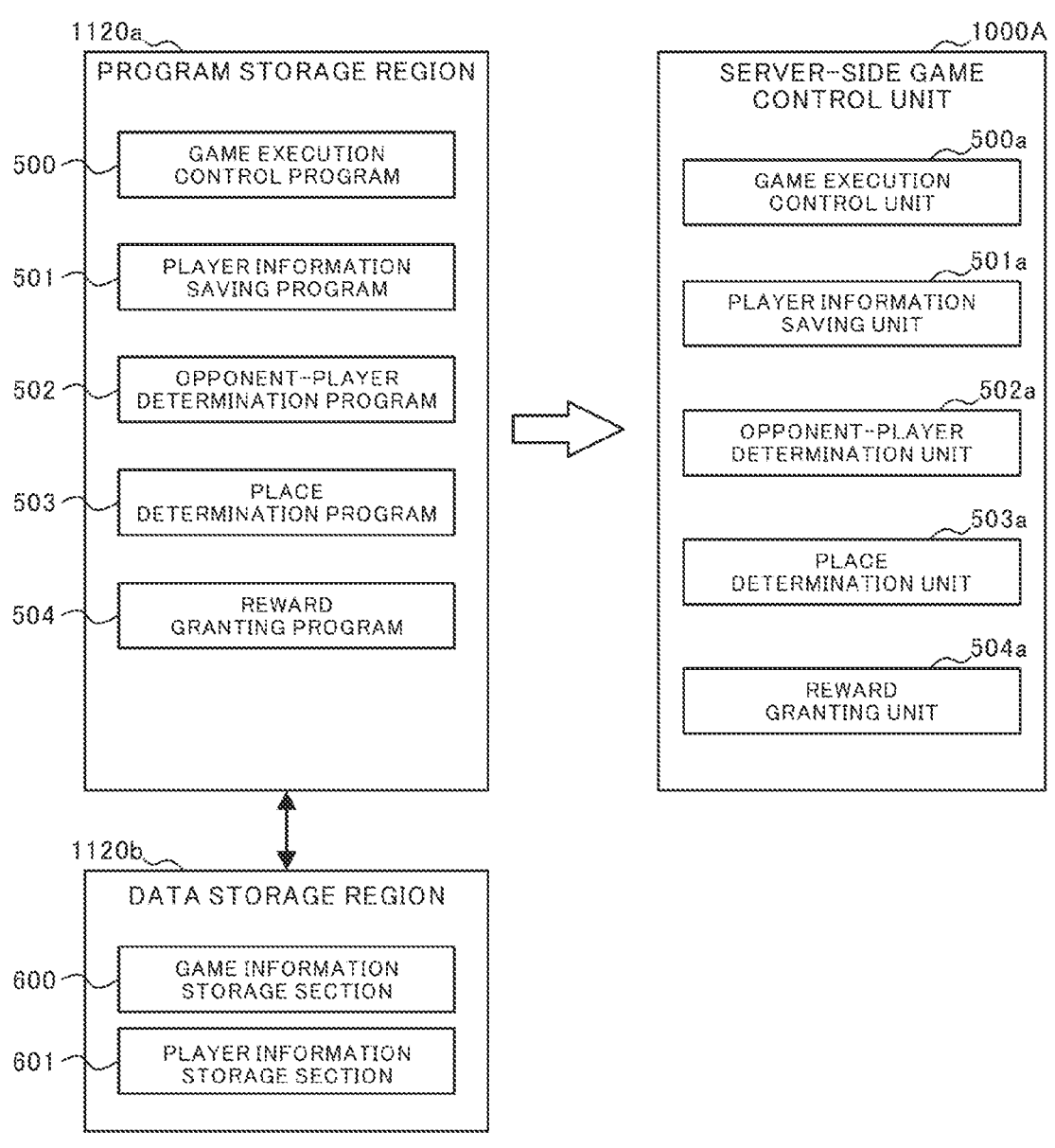
FIG. 16 is a diagram for illustrating the configuration of a memory in the server and functions of the server as a computer.

FIG. 16 is a diagram for illustrating the configuration of the memory 1120 in the server 1000 and functions of the server 1000 as a computer. A program storage region 1120a and a data storage region 1120b are provided in the memory 1120. When the game is started, the CPU 1100 stores server-side game control programs (modules) in the program storage region 1120a.

The server-side game control programs include: a game execution control program 500; a player-information saving program 501; an opponent-player determination program 502; a place determination program 503; and a reward granting program 504. The programs listed in FIG. 16 are examples, and many other programs are provided as the server-side game control programs.

In the data storage region 1120b, a game information storage section 600 and a player information storage section 601 are provided as storage sections for storing data. Each of the aforementioned storage sections is an example, and many other storage sections are provided in the data storage region 1120b.

The CPU 1100 operates the programs stored in the program storage region 1120a and updates data in each of the storage sections in the data storage region 1120b. Also, the CPU 1100 causes the server 1000 to function as a server-side game control unit 1000A by operating the programs stored in the program storage region 1120a. The server-side game control unit 1000A includes a game execution control unit 500a, a player-information saving unit 501a, an opponent-player determination unit 502a, a place determination unit 503a, and a reward granting unit 504a.

More specifically, the CPU 1100 causes the computer to function as the game execution control unit 500a by operating the game execution control program 500. Similarly, the CPU 1100 causes the computer to function as the player-information saving unit 501a, the opponent-player determination unit 502a, the place determination unit 503a, and the reward granting unit 504a by operating the player-information saving program 501, the opponent-player determination program 502, the place determination program 503, and the reward granting program 504, respectively.

The game execution control unit 500a controls the proceeding of the entire game. For example, upon receiving login information from the player terminal 1, the game execution control unit 500a allows the player terminal 1 to download the player information saved in the player information storage section 601.

Upon downloading player information (e.g., proceeding information and game result information) from the player terminal 1, the player-information saving unit 501a saves the downloaded player information in the player information storage section 601.

Upon receiving opponent-player candidate request information from the player terminal 1, the opponent-player determination unit 502a extracts three other players serving as candidates for opponent players combating against the player in the 1V1 battle. More specifically, for example, three other players who are in a place higher than the place of the player by a prescribed number (e.g., 50) in the 1V1 battle are randomly extracted. At this time, in irregular cases, such as in a case where the current player's place in the 1V1 battle is higher (e.g., 1st to 3rd), three players including players whose places are lower than the current player's place are randomly extracted in order to secure opponent players. Also, the opponent-player determination unit 502a allows the player terminal 1 to download, from the server 1000, opponent player information including at least information regarding the places of the extracted three other players in the 1V1 battle and parties for 1V1 of the extracted three other players, as well as player information including at least information regarding the player's place in the 1V1 battle.

The place determination unit 503a determines the places of players on the basis of the result of the battle game. More specifically, for example, if the player beats the other player serving as an opponent player, the place determination unit 503a exchanges the player's place with that of the opponent player.

The reward granting unit 504a grants a reward to the player. More specifically, the reward granting unit 504a adds an item (ranking reward) to player information corresponding to the player ID of the player according to each player's place in the 1V1 battle at a prescribed time clock that has been preset and saves the player information in the player information storage section 601.

(Communication Process Between Player Terminal 1 and Server 1000)

Figure 17:
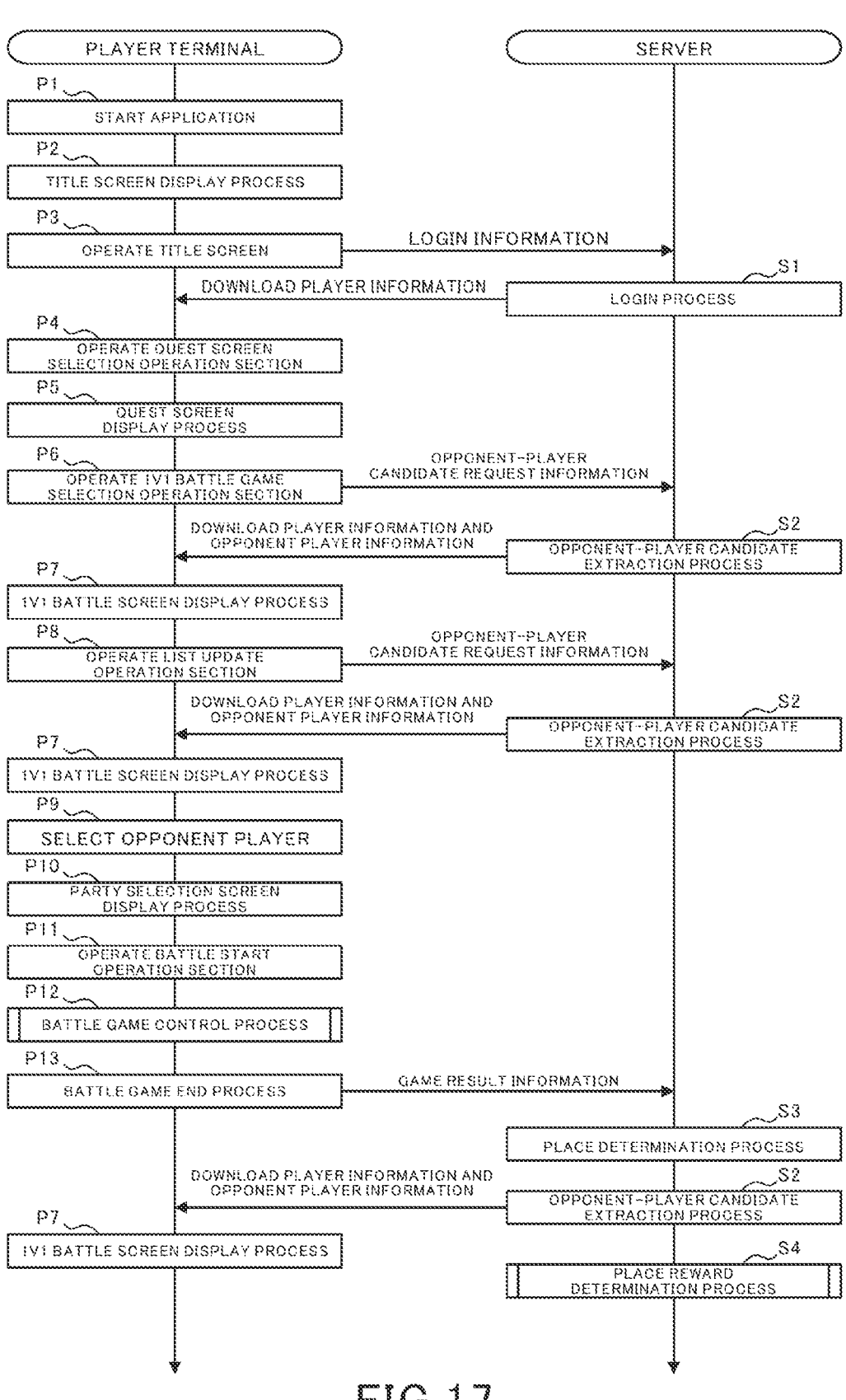
FIG. 17 is a sequence diagram for illustrating basic processes of the player terminal and the server.

FIG. 17 is a sequence diagram for illustrating basic processes of the player terminal 1 and the server 1000. Note that, in the following description, processes in the player terminal 1 are denoted as Pn (n is any integer). Furthermore, processes in the server 1000 are denoted as Sn (n is any integer).

When the player starts the game application on the player terminal 1 (P1), the rendering unit 304a executes a screen display process for displaying the title screen 30 on the display 26 (P2).

When an operation is performed by the player on the title screen 30 (P3) while the title screen 30 is displayed on the display 26, the game execution control unit 300a transmits login information to the server 1000.

Upon receiving the login information, the game execution control unit 500a of the server 1000 executes a login process by identifying the player ID associated with the login information (S1). Here, the server 1000 allows the player terminal 1 to download the player information corresponding to the identified player ID from the player information storage section 401. Note that the player information includes a plurality of ally character IDs associated with the player ID, game release information indicating whether or not battle games in each type of battle games are released, the player level, the player stamina, the player's place in the 1V1 battle, in-game currency, lottery items, etc.

When the quest-screen selection operation section 41d on the menu bar 41 is operated on the home screen 40 (P4), the rendering unit 304a of the player terminal 1 executes a quest screen display process for displaying, on the display 26, the quest screen 50 shown in FIG. 3C (P5).

When the 1V1-battle selection operation section 51c is operated on the quest screen 50 (P6), the game execution control unit 300a transmits opponent-player candidate request information to the server 1000.

Upon receiving the opponent-player candidate request information, the opponent-player determination unit 502a of the server 1000 executes an opponent-player candidate extraction process (S2). In the opponent-player candidate extraction process (S2), the opponent-player determination unit 502a identifies the player ID associated with the opponent-player candidate request information and extracts three other players serving as candidates for opponent players in the 1V1 battle.

More specifically, for example, three other players who are in a place higher than the place of the player by a prescribed number (e.g., 50) in the 1V1 battle are randomly extracted. At this time, in irregular cases, such as in a case where the current player's place in the 1V1 battle is higher (e.g., 1st to 3rd), three players including players whose places are lower than the current player's place are randomly extracted in order to secure opponent players.

Also, the opponent-player determination unit 502a allows the player terminal 1 to download, from the server 1000, opponent player information including at least information regarding the places of the extracted three other players in the 1V1 battle and parties for 1V1 of the extracted three other players, as well as player information including at least information regarding the player's place in the 1V1 battle.

The player-information saving unit 302a of the player terminal 1 stores the downloaded opponent player information and player information in the data storage region 12b and displays the 1V1 battle screen 90 shown in FIG. 8A on the display 26 on the basis of the opponent player information and the player information (P7).

When the list update operation section 92a is operated while the 1V1 battle screen 90 is displayed on the display 26 (P8), the game execution control unit 300a transmits opponent-player candidate request information to the server 1000.

Upon receiving the opponent-player candidate request information, the opponent-player determination unit 502a executes the opponent-player candidate extraction process in the same manner as in step S2 above. The rendering unit 304a of the player terminal 1 displays the 1V1 battle screen 90 on the display 26 in the same manner as in step P7 above.

When the party of a player to combat against (opponent player) is selected (operated) from among the other players displayed in the opponent-player list display region 92 on the 1V1 battle screen 90 (P9), the rendering unit 304a displays, on the display 26, the party selection screen 94 shown in FIG. 8B, 13, or 14A on the basis of the opponent player information and user information (P10).

At this time, on the basis of the opponent player information and the user information, the permission unit 305a decides whether or not the current player is in a place that allows skipping by referring to the skip-allowed-place determination table shown in FIG. 9. In addition, the permission unit 305a determines whether or not to display wording, as well as the display pattern of the wording, in the information display region 98 at the player terminal 1 on the basis of whether or not the opponent player's place in the 1V1 battle is lower than the current player's place, whether or not the game is set so that the skip function is used in "1V1 battle", and whether or not the current player is in a place that allows skipping. The rendering unit 304a displays wording in the information display region 98 in a manner determined by the permission unit 305a.

When the battle-start operation section 97 on the party selection screen 94 is operated (tapped) (P11), a battle-game control process is executed in the terminal-side game control unit 1A (P12).

Figure 18:
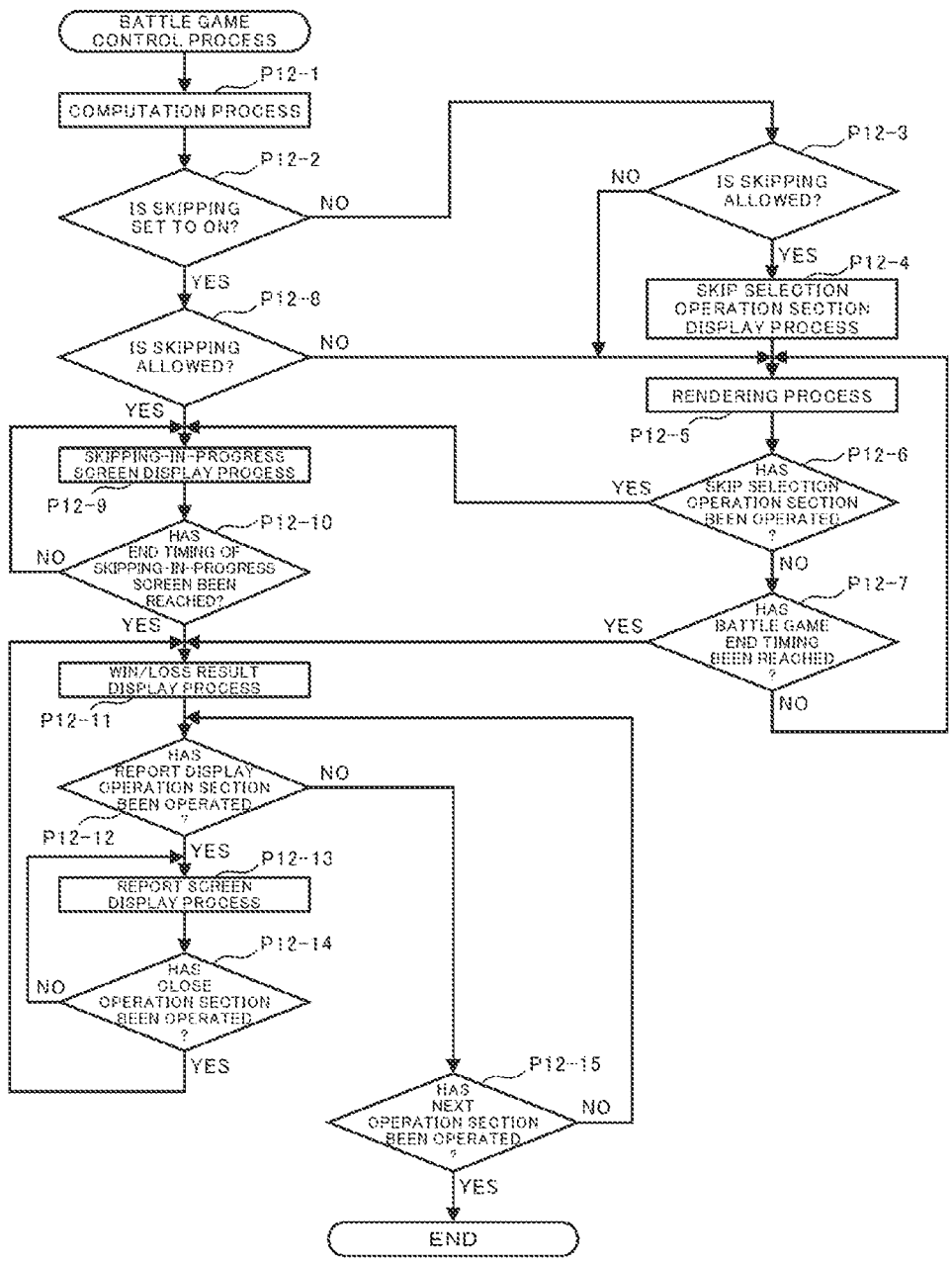
FIG. 18 is a drawing for illustrating an example of a battle-game control process in this embodiment.

FIG. 18 is a drawing for illustrating an example of the battle-game control process in this embodiment. The computation unit 303a executes a computation process for deriving progress and a result of the battle game (P12-1). More specifically, the computation unit 303a executes a computation process for executing processing related to determination and execution of an attack carried out by each character in the battle game, processing for deciding whether or not each character has been damaged and how severely each character has been damaged, processing for selecting a motion related to position movement and dropout of each character, and processing for determining a win and a loss in the battle game. In other words, processing related to a win and a loss of the battle game is executed in the computation process.

The permission unit 305a of the player terminal 1 decides whether or not the game is set so that the skip function is used (P12-2). In the case where the game is not set so that the skip function is used as a result (NO in P12-2), the flow proceeds to step P12-3 (described below), and in the case where the game is set so that the skip function is used as a result (YES in P12-2), the flow proceeds to step P12-8 (described below).

In the case where the game is not set so that the skip function is used (NO in P12-2), the permission unit 305a of the player terminal 1 decides, on the basis of the opponent player information and the user information, whether or not the current player is in a place that allows skipping by referring to the skip-allowed-place determination table shown in FIG. 9 (P12-3). In the case where the current player is in a place that allows skipping as a result (YES in P12-3), the flow proceeds to step P12-4 (described below), and in the case where the current player is not in a place that allows skipping (NO in P12-3), the flow proceeds to step P12-5 (described below). Note that when a battle game in the 1V1 battle between the player and the other player serving as an opponent player is started, the places of the player and the other player serving as an opponent player just before the start of execution of the battle game in the 1V1 battle may be acquired again.

The permission unit 305a executes a skip-selection-operation-section display process for displaying the skip selection operation section 104 on the display 26 (P12-4).

The rendering unit 304a executes a rendering process for rendering animations on the display 26 on the basis of the result of the computation process in step P12-1 above (P12-5). More specifically, as the rendering process, the rendering unit 304a executes: processing for outputting a motion related to position movement and dropout of each character; processing for rendering animations related to an attack motion and presentation of a killer technique invoked by each character; processing for updating the life points 101a and the killer technique gauge 101b for each character; and processing for displaying user interfaces (UIs) including the auto selection operation section 102 and the quick-feed selection operation section 103.

The battle game control unit 301a decides whether or not the skip selection operation section 104 has been operated (P12-6). In the case where the skip selection operation section 104 has not been operated as a result, the flow proceeds to step P12-7 (described below), and in the case where the skip selection operation section 104 has been operated, the flow proceeds to step P12-9 (described below).

The battle game control unit 301a decides whether or not now is a time at which the battle game in the 1V1 battle ends (P12-7). In the case where now is a time at which the battle game in the 1V1 battle ends as a result (YES in P12-7), the flow proceeds to step P12-11 (described below), and in the case where now is not a time at which the battle game in the 1V1 battle ends (NO in P12-7), the flow proceeds to step P12-5 above. Here, the time at which the battle game ends as decided in step P12-7 refers to the time at which rendering of all animations is completed on the display 26 on the basis of the result of the computation process in step P12-1 above.

In the case where the game is set so that the skip function is used (YES in P12-2), the permission unit 305a of the player terminal 1 decides, on the basis of the opponent player information and the user information, whether or not the current player is in a place that allows skipping by referring to the skip-allowed-place determination table shown in FIG. 9 (P12-8). In the case where the current player is in a place that allows skipping as a result (YES in P12-8), the flow proceeds to step P12-9 (described below), and in the case where the current player is not in a place that allows skipping as a result (NO in P12-8), the flow proceeds to step P12-5 above.

The rendering unit 304a executes the skipping-in-progress screen display process for displaying, on the display 26, the skipping-in-progress screen 110 shown in FIG. 11C (P12-9).

The battle game control unit 301a decides whether or not now is an end time at which a certain time period of display of the skipping-in-progress screen 110 on the display 26 is completed (P12-10). In the case where now is an end time at which a certain time period of display of the skipping-in-progress screen 110 on the display 26 is completed as a result, the flow proceeds to step P12-11 (described below), and in the case where now is not an end time at which a certain time period of display of the skipping-in-progress screen 110 on the display 26 is completed as a result, the flow proceeds to step P12-10 above. Note that the skipping-in-progress screen 110 may be displayed until the computation process related to the battle game ends and may be made to disappear when the computation ends. That is, the certain time period for which display of the skipping-in-progress screen 110 continues on the display 26 need not be a fixed time period but may be a time period until the computation process ends.

The rendering unit 304a executes a win/loss result display process for displaying the result screen 120 on the display 26 on the basis of the result of the computation process in step P12-1 above (P12-11).

The battle game control unit 301a decides whether or not the report display operation section 121 on the result screen 120 has been operated (P12-12). In the case where the report display operation section 121 has been operated as a result, the flow proceeds to step P12-13 (described below), and in the case where the report display operation section 121 has not been operated, the flow proceeds to step P12-15 (described below).

The rendering unit 304a executes a report screen display process for displaying the report screen 130 on the display 26 on the basis of the result of the computation process in step P12-1 above (P12-13).

The battle game control unit 301a decides whether or not the close operation section 131 on the report screen 130 has been operated (P12-14). In the case where the close operation section 131 has been operated as a result, the flow proceeds to step P12-11 above, and in the case where the close operation section 131 has not been operated as a result, the flow proceeds to step P12-13 above.

The battle game control unit 301a decides whether or not the next operation section 122 on the result screen 120 has been operated (P12-15). In the case where the next operation section 122 has not been operated as a result, the flow proceeds to step P12-12 above, and in the case where the next operation section 122 has been operated, the battle-game control process ends.

Referring back to FIG. 17, the battle game control unit 301a executes a battle game end process for transmitting, to the server 1000, game result information including a win and a loss in the battle game based on the result of the computation process in step P12-1 above and skip information indicating whether or not the skip function has been used in the battle game (P13).

Upon receiving the game result information, the place determination unit 503a of the server 1000 executes a place determination process for determining the places of the players on the basis of the result of the battle game (S3). In the place determination process, a predetermined cheat decision process is first executed. In the cheat decision process, in the case where the skip function is used, it is decided on the basis of the places of the player and the other player serving as an opponent player just before the start of execution of the battle game in the 1V1 battle whether or not the current player is in a place that allows skipping by referring to the skip-allowed-place determination table shown in FIG. 9. In the case where the current player is in a place that allows skipping as a result, the player's place and the place of the other player serving as an opponent player are determined on the basis of the result of the battle game. On the other hand, in the case where it is decided that the current player is in a place that does not allow skipping in the cheat decision process, the result of the battle game is treated as invalid.

Thereafter, the opponent-player candidate extraction process is executed in the same manner as in step S2 above. The rendering unit 304a of the player terminal 1 displays the 1V1 battle screen 90 on the display 26 in the same manner as in step P7 above. In addition, the reward granting unit 504a of the server 1000 executes a place reward determination process (S4).

Figure 19:
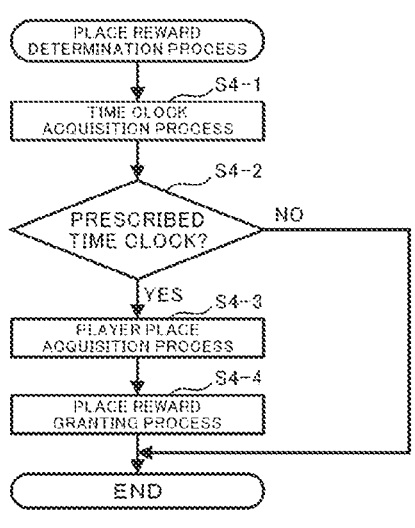
FIG. 19 is a drawing for illustrating an example of a place reward determination process in this embodiment.

FIG. 19 is a drawing for illustrating an example of the place reward determination process in this embodiment. The reward granting unit 504a of the server 1000 executes a time clock acquisition process for acquiring the current time clock (S4-1).

The reward granting unit 504a of the server 1000 decides whether or not the current time clock acquired in step S4-1 above is the prescribed time clock that has been preset. In the case where the current time clock is the prescribed time clock that has been preset as a result (YES in S4-2), the flow proceeds to step S4-3 (described below), and in the case where the current time clock is not the prescribed time clock that has been preset, the place reward determination process ends.

The reward granting unit 504a of the server 1000 executes a player place acquisition process for acquiring the place of each of the players in the 1V1 battle by referring to the player information of each of the players (S4-3).

The reward granting unit 504a of the server 1000 executes a place reward granting process and ends the place reward determination process. More specifically, in the place reward granting process, the reward granting unit 504a determines the content of a reward on the basis of the place of each of the players in the 1V1 battle acquired in step S4-3 above, by referring to the reward-content determination table shown in FIG. 7. Then, the reward granting unit 504a adds the determined item (ranking reward) to the player information corresponding to the player ID of each of the players and saves the player information in the player information storage section 601.

As described above, the game execution control program 300, the battle game control program 301, the player-information saving program 302, the computation program 303, the rendering program 304, and the permission program 305 are provided in the player terminal 1. In addition, the player terminal 1 functions as the game execution control unit 300a, the battle game control unit 301a, the player-information saving unit 302a, the computation unit 303a, the rendering unit 304a, and the permission unit 305a. However, some or all of these programs and functional units may be provided in the server 1000. That is, these programs and functional units may be provided in either or both of the player terminal 1 and the server 1000.

In addition, the game execution control program 500, the player-information saving program 501, the opponent-player determination program 502, the place determination program 503, and the reward granting program 504 are provided in the server 1000. In addition, the server 1000 functions as the game execution control unit 500a, the player-information saving unit 501a, the opponent-player determination unit 502a, the place determination unit 503a, and the reward granting unit 504a. However, some or all of these programs and functional units may be provided in the player terminal 1. That is, these programs and functional units may be provided in either or both of the player terminal 1 and the server 1000.

In addition, the information processing programs in the aforementioned embodiment may be stored in a computer-readable storage medium, and may be provided in the form of a storage medium. Furthermore, those programs may be provided in the form of a player terminal or an information processing system including this storage medium. Furthermore, the embodiment described above may be an information processing method for realizing the functions and the steps shown in the flowcharts.

Although an aspect of an embodiment has been described with reference to the accompanying drawings, it goes without saying that the present invention is not limited to the embodiments described above. It would be obvious that a person skilled in the art could conceive of various modifications and amendments within the scope recited in the claims, and it will be understood that those modifications and amendments obviously belong to the technical scope of the present invention.

As a specific example where a battle game in the short-cut mode is enabled in the case where players are in a prescribed place and a battle game in the short-cut mode is disabled in the case where players are not in the prescribed place, the aforementioned embodiment has been described by way of an example where the prescribed place is a place included in a range of the preset first reference place (51st place) or lower. However, the present invention is not limited to this specific example.

FIG. 20A is a diagram showing an example of a skip-allowed-place determination table in a first modification. In the first modification, the game is set so that the player is not in a place that allows skipping in the case where at least one of the current player's place in the 1V1 battle and the opponent player's place in the 1V1 battle is the 1501th place or lower. In addition, the game is set so that the current player is in a place that allows skipping in the case where neither the current player's place in the 1V1 battle nor the opponent player's place in the 1V1 battle is the 1501th place or lower. By constraining lower ranked players from using the skip function as described above, players at the beginner's stage are forced to carefully watch animations of a battle game in the 1V1 battle and are thus encouraged to naturally learn the content of the battle game in the 1V1 battle. By doing so, it is possible to suppress the risk of a player at the beginner's stage failing to sufficiently understand details of the battle game and hence becoming less interested in the battle game.

More specifically, for example, in the case of (1) in the skip-allowed-place determination table in FIG. 20A, the opponent player's place is the 1501th place or lower, and the current player's place is the 1501th place or lower, and the game is thus set so that the current player is not in a place that allows skipping.

In addition, in the case of (2) in the skip-allowed-place determination table in FIG. 20A, the current player's place is not the 1501th place or lower, but the opponent player's place is the 1501th place or lower, and the game is thus set so that the current player is not in a place that allows skipping.

In addition, in the case of (3) in the skip-allowed-place determination table in FIG. 20A, the current player's place is the 1501th place or lower, but the opponent player's place is not the 1501th place or lower, and the game is thus set so that the current player is not in a place that allows skipping.

In addition, in the case of (4) in the skip-allowed-place determination table in FIG. 20A, the current player's place is not the 1501th place or lower, and the opponent player's place is not the 1501th place or lower, and the game is thus set so that the current player is in a place that allows skipping.

As described above, when the game is set so that a battle game in the short-cut mode is enabled in the case where players are in a prescribed place and a battle game in the short-cut mode is disabled in the case where players are not in the prescribed place, the prescribed place may be a place included in a range of a preset second reference place (1500th) or higher.

FIG. 20B is a diagram showing an example of a skip-allowed-place determination table in a second modification. In a second modification, the game is set so that the current player is not in a place that allows skipping in the case where at least one of the current player's place in the 1V1 battle and the opponent player's place in the 1V1 battle is either within the first 50 places or the 1501th place or lower, as shown in FIG. 20B. Furthermore, the game is set so that the current player is in a place that allows skipping in the case where neither the current player's place in the 1V1 battle nor the opponent player's place in the 1V1 battle is within the first 50 places, and neither the current player's place in the 1V1 battle nor the opponent player's place in the 1V1 battle is the 1501th place or lower.

For example, if more 1V1 battles than wanted are executed, competition may become too fierce, rather decreasing an interest in the battle game. Therefore, by constraining higher ranked players from using the skip function, it is possible to reduce the risk of a local increase in the frequency per unit of time at which more 1V1 battles than wanted are executed. This promotes moderate competition, making it possible to suppress the risk of decreasing an interest in the battle game. Moreover, by constraining lower ranked players from using the skip function, players at the beginner's stage are forced to carefully watch animations of a battle game in the 1V1 battle and are thus encouraged to naturally learn the content of the battle game in the 1V1 battle. By doing so, it is possible to suppress the risk of a player at the beginner's stage failing to sufficiently understand details of the battle game and hence becoming less interested in the battle game.

As described above, when the game is set so that a battle game in the short-cut mode is enabled in the case where players are in a prescribed place and a battle game in the short-cut mode is disabled in the case where players are not in the prescribed place, the prescribed place may be a place that is included in a range of a preset first reference place (51th) or lower and that is included in a range of a preset second reference place (1500th) or higher, the preset second reference place being lower than the preset first reference place.

FIG. 21 is a diagram showing an example of a skip-allowed-place determination table in a third modification. In a third modification, the game is set so that the current player is not in a place that allows skipping in the case where both the current player's place in the 1V1 battle and the opponent player's place in the 1V1 battle are either within the first 50 places or the 1501th place or lower, as shown in FIG. 21. Furthermore, the game is set so that the current player is in a place that allows skipping in the case where neither the current player's place in the 1V1 battle nor the opponent player's place in the 1V1 battle is within the first 50 places, or neither the current player's place in the 1V1 battle nor the opponent player's place in the 1V1 battle is the 1501th place or lower.

As described above, higher ranked players and lower ranked players are not constrained from using the skip function, but intermediate ranked players are constrained from using the skip function. If higher ranked and lower ranked players are not constrained from using the skip function, players at the beginner's stage can execute more battle games in the 1V1 battle per unit of time by using the skip function. Therefore, it is possible to make higher ranked and lower ranked players more interested in the battle game. In addition, because intermediate ranked players will struggle with a battle game in the 1V1 battle to win a higher place in the ranking by aiming at being entitled to use the skip function, it is also possible to make the intermediate ranked players more motivated to play the game.

As described above, when the game is set so that a battle game in the short-cut mode is enabled in the case where players are in a prescribed place and a battle game in the short-cut mode is disabled in the case where players are not in the prescribed place, the prescribed place may be a place that is included in a range of a preset first reference place (1501th) or lower or that is included in a range of a preset second reference place (50th) or higher, the preset second reference place being higher than the preset first reference place (1500th).

In addition, the aforementioned embodiment has been described by way of an example where when the skip function is used, the skipping-in-progress screen 110, on which not only is the entire screen of the display 26 dimmed but also the wording "Skipping" is displayed at the center of the display 26 to inform the player that the skip function has been used, is displayed on the display 26 for a certain time period, as shown in FIG. 11C. However, the present invention is not limited to this example.

Figure 22A:
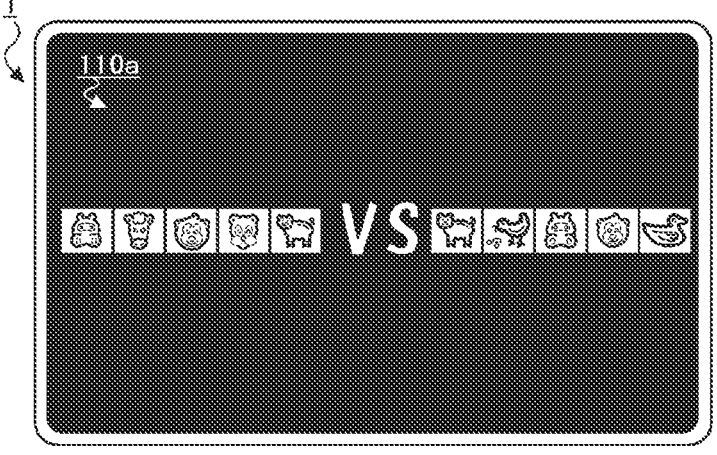
FIG. 22A is a drawing for illustrating an example of a skipping-in-progress screen in a fourth modification.
Figure 22B:
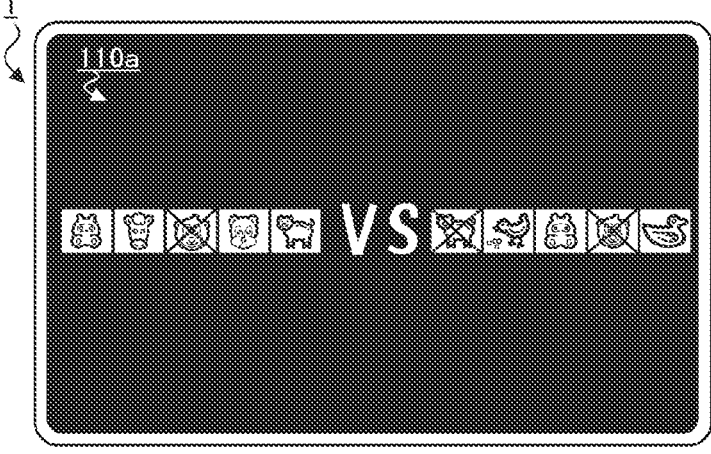
FIG. 22B is a drawing for illustrating an example of the skipping-in-progress screen in a fourth modification.

FIGS. 22A and 22B are drawings for illustrating an example of a skipping-in-progress screen 110*a* in a fourth modification. In the fourth modification, in the case where the skip function is used, display of the skipping-in-progress screen 110*a* continues on the display 26 for a certain time period, as shown in FIGS. 22A and 22B.

More specifically, as shown in FIG. 22A, the entire screen of the display 26 is dimmed, with icons of ally characters and enemy characters being displayed at the center. Then, as shown in FIG. 22B, ally characters or enemy characters whose life points are "0" and that have become unable to combat accordingly during the battle game are identifiably reported on the skipping-in-progress screen 110*a* one after another. This makes it easier to visually recognize a change in the battle situation of the battle game while still reducing the execution time of the battle game, thereby suppressing the risk of decreasing an interest in the battle game.

Note that the certain time period for which the skipping-in-progress screen 110*a* shown in FIGS. 22A and 22B is displayed on the display 26 when the skip function is used is shorter than the time required when the battle game is made to proceed without using the skip function and the time required when battle execution is quickly fed in the battle game as a result of the quick-feed selection operation section 103 being operated.

Also, a battle in the battle game may be executed faster (e.g., eight times or more) when the skip function is used than when battle execution is quickly fed in the battle game as a result of the quick-feed selection operation section 103 in the aforementioned embodiment being operated.

That is, animations are also rendered in the battle game in the case where the skip function is used. By doing so, the time period for which animations are rendered in the battle game in the case where the skip function is used is shorter than the execution time of the battle that is quickly fed in the battle game as a result of the quick-feed selection operation section 103 being operated. This makes it easier to visually recognize a change in the battle situation of the battle game while still reducing the execution time of the battle game, thereby suppressing the risk of decreasing an interest in the battle game.

Furthermore, when the skip function is used, the screen may transition directly to the report screen 130 shown in FIG. 12C. In this case, the time period until the screen transitions to the report screen 130 is shorter than the time required when the battle game is made to proceed without using the skip function and the time required when battle execution is quickly fed in the battle game as a result of the quick-feed selection operation section 103 being operated. By doing so, not only is the execution time of the battle game reduced but also the report screen 130 is displayed without operating the report display operation section 84, which makes it possible to save the player from an operation needed to view the report screen 130.

In addition, in the aforementioned embodiment, use of the skip function is disabled by not displaying the skip selection operation section 104, and use of the skip function is enabled, by displaying the skip selection operation section 104. In addition, if the game is set by the player so that the skip function is used in "1V1 battle", the player does not need to perform any operation for each battle. More specifically, the skip function is used without a new operation performed by the player in the case where the player is in a prescribed place, and the skip function is not used in the case where the player is not in a prescribed place. That is, the aforementioned embodiment has been described by way of two cases including a case where the skip function is automatically executed according to whether or not the skip function is used by the player in "1V1 battle" and a case where the skip function is executed according to whether or not the player has operated the skip selection operation section 104 while a battle game in "1V1 battle" is being executed. However, the aforementioned embodiment may be provided with only one of the case where the skip function is automatically executed according to whether or not the skip function is used by the player in "1V1 battle" and the case where the skip function is executed according to whether or not the player has operated the skip selection operation section 104 while a battle game in "1V1 battle" is being executed.

What is claimed is:

1. A non-transitory computer readable medium storing a program causing a computer to perform a method comprising:

controlling a battle game on the basis of at least a play mode selected by a player from among a plurality of play modes including a normal mode and a short-cut mode having an execution time shorter than that of the normal mode;

deriving progress and a result of the battle game by a computation process;

performing animation rendering on a display on the basis of a result of the computation process during the battle game in at least the normal mode;

determining a ranking of the player among a plurality of players on the basis of the result of the battle game;

enabling the battle game in the short-cut mode in response to the ranking of the player being in a prescribed place in the ranking; and disabling the battle game in the short-cut mode in response to the ranking of the player among the plurality of players being not in the prescribed place in the ranking.

2. The non-transitory computer readable medium according to claim 1, wherein the animation rendering on the display is omitted partially or fully during the battle game in the short-cut mode.

3. The non-transitory computer readable medium according to claim 1, wherein the prescribed place is a place included in a range of a preset first reference place or lower.

4. The non-transitory computer readable medium according to claim 2, wherein the prescribed place is a place included in a range of a preset first reference place or lower.

5. The non-transitory computer readable medium according to claim 1, wherein the prescribed place is a place included in a range of a preset second reference place or higher.

6. The non-transitory computer readable medium according to claim 2, wherein the prescribed place is a place included in a range of a preset second reference place or higher.

7. The non-transitory computer readable medium according to claim 3, wherein the prescribed place is a place included in a range of a preset second reference place or higher.

8. The non-transitory computer readable medium according to claim 4, wherein the prescribed place is a place included in a range of a preset second reference place or higher.

9. An information processing method executed by at least one computer, the information processing method comprising:

controlling a battle game on the basis of at least a play mode selected by a player from among a plurality of play modes including a normal mode and a short-cut mode having an execution time shorter than that of the normal mode;

deriving progress and a result of the battle game by a computation process;

performing animation rendering on a display on the basis of a result of the computation process during the battle game in at least the normal mode;

determining a ranking of the player among a plurality of players on the basis of the result of the battle game;

enabling the battle game in the short-cut mode in response to the ranking of the player being in a prescribed place in the ranking; and disabling the battle game in the short-cut mode in response to the ranking of the player among the plurality of players being not in the prescribed place in the ranking.

10. An information processing system comprising:

a computer comprising a processor and a memory, wherein the memory comprises a program configured to perform a method comprising:

controlling a battle game on the basis of at least a play mode selected by a player from among a plurality of play modes including a normal mode and a short-cut mode having an execution time shorter than that of the normal mode;

deriving progress and a result of the battle game by a computation process;

performing animation rendering on a display on the basis of a result of the computation process during the battle game in at least the normal mode;

determining a ranking of the player among a plurality of players on the basis of the result of the battle game; and enabling the battle game in the short-cut mode in response to the ranking of the player being in a prescribed place in the ranking; and disabling the battle game in the short-cut mode in response to the ranking of the player being not in the prescribed place in the ranking.

* * * * *